United States Patent [19]

Dewa et al.

[11] Patent Number: 5,634,071
[45] Date of Patent: May 27, 1997

[54] SYNCHRONOUS PROCESSING METHOD AND APPARATUS FOR A PLURALITY OF PROCESSORS EXECUTING A PLURALITY OF PROGRAMS IN PARALLEL

[75] Inventors: Masami Dewa; Shigeru Nagasawa; Masayuki Ikeda; Haruhiko Ueno; Naoki Shinjo; Teruo Utsumi; Kazushige Kobayakawa; Kenichi Ishizaka; Moriyuki Takamura, all of Kawasaki, Japan

[73] Assignee: Fujitsu Limited, Japan

[21] Appl. No.: 601,705

[22] Filed: Feb. 15, 1996

Related U.S. Application Data

[63] Continuation of Ser. No. 160,181, Dec. 2, 1993, abandoned.

[30] Foreign Application Priority Data

Dec. 18, 1992 [JP] Japan ................. 4-338502

[51] Int. Cl.[6] ................................. G06F 9/00
[52] U.S. Cl. .................... 395/800; 395/553; 395/676; 364/271; 364/281.3; 364/281.4; 364/281.7
[58] Field of Search .................... 395/800, 650; 364/281.3, 271, 281.4, 281.7

[56] References Cited

U.S. PATENT DOCUMENTS

| | | | |
|---|---|---|---|
| 5,107,420 | 4/1992 | Kametani | 395/650 |
| 5,222,229 | 6/1993 | Fukuda et al. | 395/550 |
| 5,243,698 | 9/1993 | May | 395/200 |
| 5,307,495 | 4/1994 | Seino et al. | 395/650 |
| 5,361,369 | 11/1994 | Kametani | 395/800 |
| 5,481,747 | 1/1996 | Kametani | 395/800 |

OTHER PUBLICATIONS

Hamacher et al., "Computer Organization" 2nd Ed, McGraw Hill, Inc. NY, 1984 pp. 464–465, 454–455.

Primary Examiner—Thomas G. Black
Assistant Examiner—Valerie Darbe
Attorney, Agent, or Firm—Staas & Halsey

[57] ABSTRACT

A synchronous processing system including a plurality of processors and a communications network. Each processor includes a synchronization combination storage element, status storage element, control element, judging element and shifting element. The synchronization combination storage element stores synchronization combination information showing a group of the processors being synchronized during the parallel execution of a program. The synchronous status storage element stores synchronous status information indicating that a synchronous waiting status is reached after the processor has finished its processing. A storage control element transmits the synchronous status information to all other processors. A judging element judges whether the group of processors are in synchronism based on the synchronization combination information and the transmitted status information. A processing shifting element shifts, when the group of processors are judged to be in synchronism, all the processors in the group to the next process of a program.

33 Claims, 23 Drawing Sheets

F I G. 6
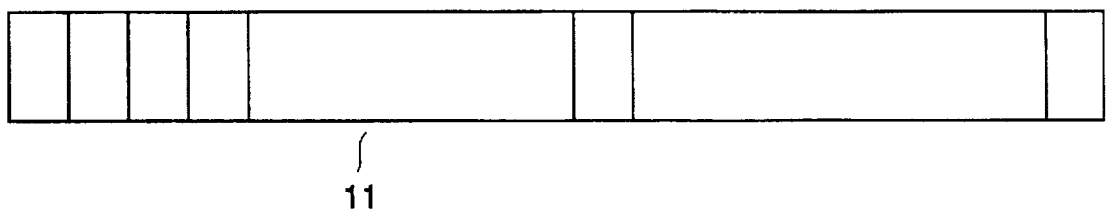

FIG.7

| NAME OF PROCESSOR | CONTENTS OF SYNCHRONOUS MASK REGISTER 11 | USING PROGRAM |
|---|---|---|
| PROCESSOR 1-0 | 11011100 | PROGRAM A |
| PROCESSOR 1-1 | 11011100 | PROGRAM A |
| PROCESSOR 1-2 | 00100011 | PROGRAM B |
| PROCESSOR 1-3 | 11011100 | PROGRAM A |
| PROCESSOR 1-4 | 11011100 | PROGRAM A |
| PROCESSOR 1-5 | 11011100 | PROGRAM A |
| PROCESSOR 1-6 | 00100011 | PROGRAM B |
| PROCESSOR 1-7 | 00100011 | PROGRAM B |

FIG. 12

| NAME OF PROCESSOR | SYNCHRONOUS MASK REGISTER 14 | SYNCHRONOUS MASK CONTROL REGISTER 17 |
|---|---|---|
| PROCESSOR 1-0 | 1 1 1 0 | 0 |
| PROCESSOR 1-1 | 1 1 1 0 | 0 |
| PROCESSOR 1-2 | 1 1 1 0 | 0 |
| PROCESSOR 1-3 | 1 1 1 0 | 0 |
| PROCESSOR 1-4 | 0 1 1 1 | 1 |
| PROCESSOR 1-5 | 0 1 1 1 | 1 |
| PROCESSOR 1-6 | 0 1 1 1 | 1 |
| PROCESSOR 1-7 | 0 1 1 1 | 1 |

FIG.14

| NAME OF PROCESSOR | SYNCHRONOUS MASK REGISTER 14 | SYNCHRONOUS MASK CONTROL REGISTER 17 |
|---|---|---|
| PROCESSOR 1-0 | 1 1 1 0 | 0 0 |
| PROCESSOR 1-1 | 1 1 1 0 | 0 0 |
| PROCESSOR 1-2 | 1 1 1 0 | 0 0 |
| PROCESSOR 1-3 | 1 1 1 0 | 0 0 |
| PROCESSOR 1-4 | 0 1 1 1 | 0 1 |
| PROCESSOR 1-5 | 0 1 1 1 | 0 1 |
| PROCESSOR 1-6 | 0 1 1 1 | 0 1 |
| PROCESSOR 1-7 | 0 1 1 1 | 0 1 |
| PROCESSOR 1-8 | 1 0 1 1 | 1 0 |
| PROCESSOR 1-9 | 1 0 1 1 | 1 0 |
| PROCESSOR 1-10 | 1 0 1 1 | 1 0 |
| PROCESSOR 1-11 | 1 0 1 1 | 1 0 |

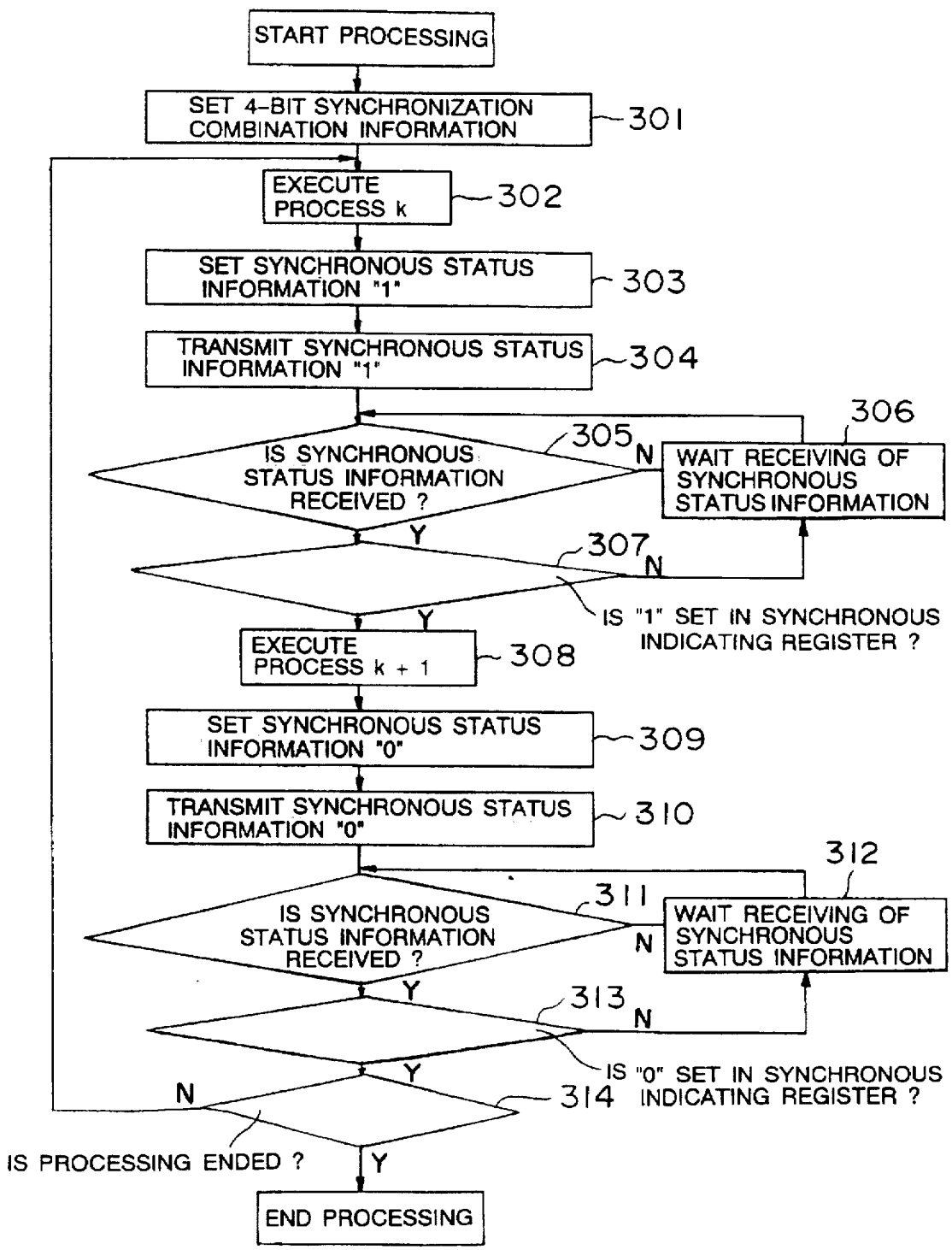

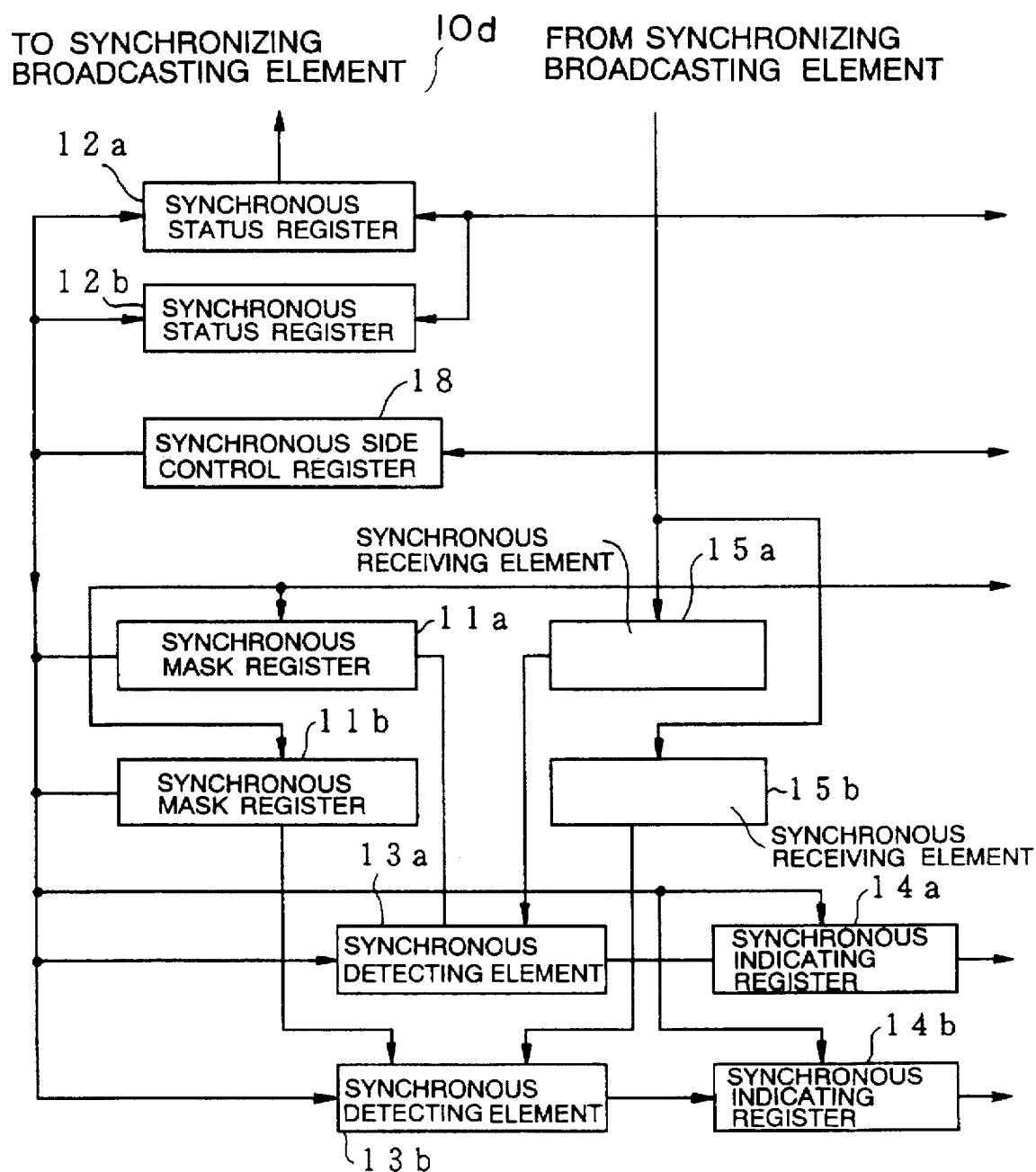

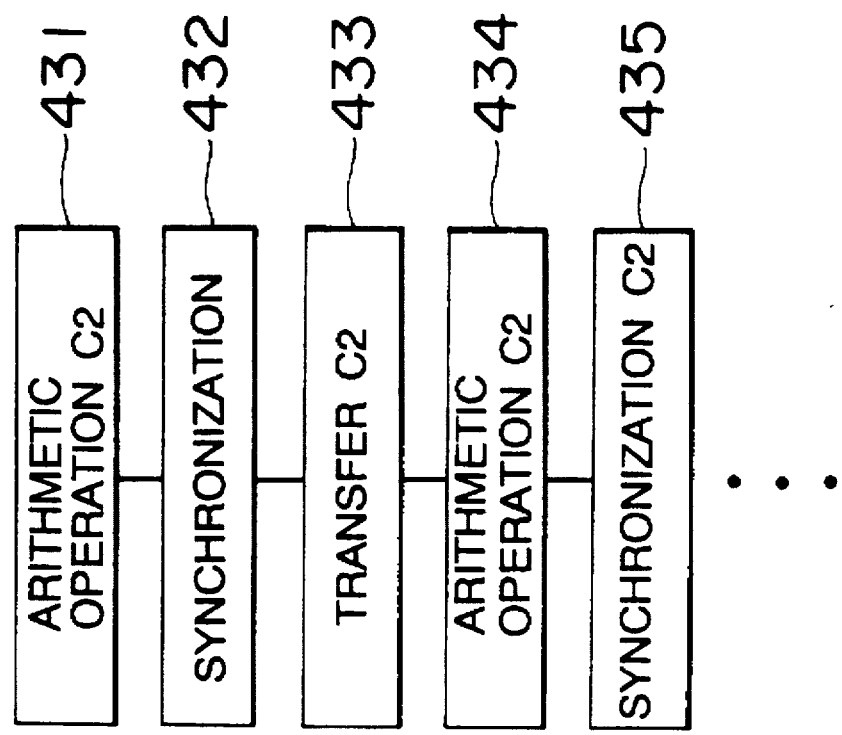
FIG.19(b) SUBPROGRAM C2
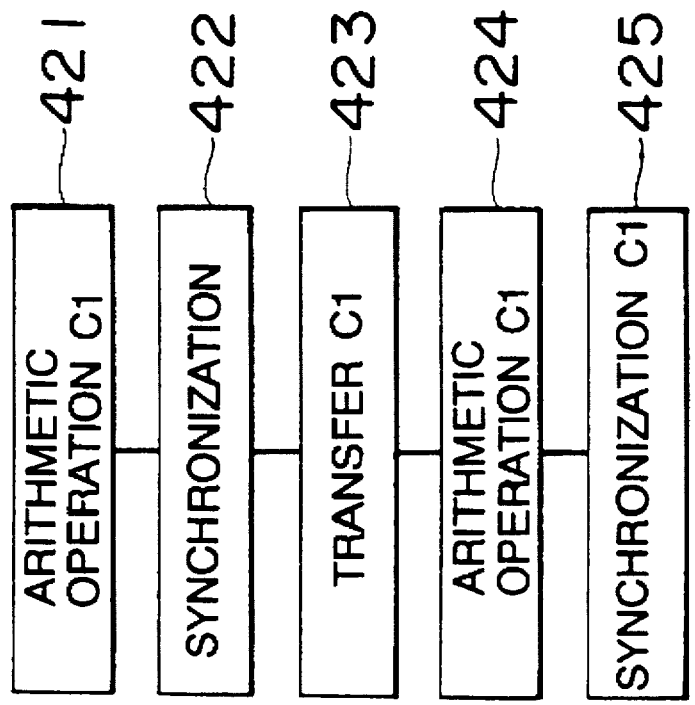
FIG.19(a) SUBPROGRAM C1

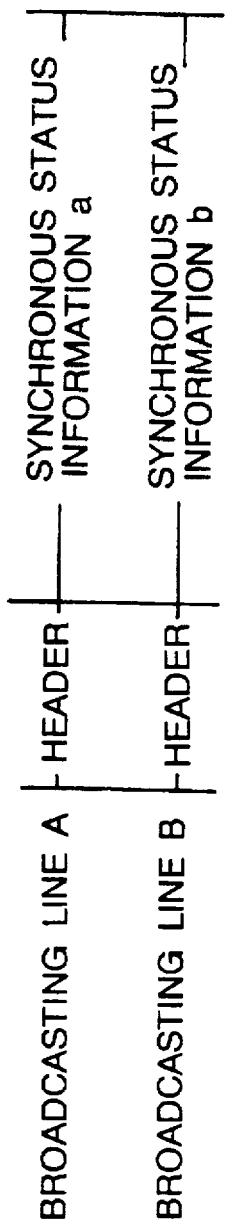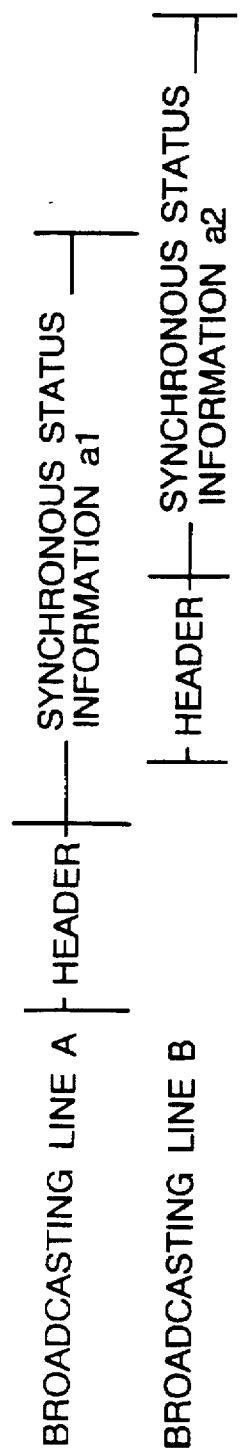

SYNCHRONOUS PROCESSING METHOD AND APPARATUS FOR A PLURALITY OF PROCESSORS EXECUTING A PLURALITY OF PROGRAMS IN PARALLEL

This application is a continuation of application Ser. No. 08/160,181, filed Dec. 2, 1993, now abandoned.

BACKGROUND OF THE INVENTION

1. Field of the Invention

The present invention relates to a synchronous processing method and apparatus for a plurality of processors, and more particularly, to a method and apparatus in which a plurality of processors execute a plurality of programs in parallel and in synchronism.

2. Description of the Related Art

In recent years, with demands for increases both in speed and in capacity of a computer system, there has been developed a distributed processing technology for distributing processes to a plurality of processors. For example, in a multiprocessor system in which a multiplicity of processors are connected, the respective processors execute processes in parallel. In this multiprocessor system, the respective processors communicate with each other via a communications unit, operate in parallel and execute a certain batch process on the whole. According to this multiprocessor system, one job can be processed at a higher speed.

Furthermore, in the multiprocessor system, the individual processors for effecting the parallel processing have to execute processes containing a plurality of phases in some cases. This synchronous processing is conducted by the following actions. To start with, the processor which has finished its processing the earliest detects that a synchronous waiting status is reached, and waits for an end of the processing by another processor before synchronization begins. Namely, this processor waits until all other processors reach the synchronous waiting status, so that the processors may become synchronized. Then, upon detecting that all the processors have reached the synchronous waiting status, all the processors execute the synchronization process discussed below.

Synchronous processing is conducted by a synchronous processing element provided in each processor. This synchronous processing element includes a synchronous status register, a synchronous receiving element and a synchronous detecting element. At the first onset, the processor which has finished its processing earliest sets, in its synchronous status register, a piece of synchronous status information (e.g., "1") indicating that the processor has reached the synchronous waiting status. Then, this synchronous status information is transmitted via a communication unit to all other processors. The synchronous status information is set in the synchronous receiving elements in all other processors. Next, the processors which have finished their processings set the synchronous status information in their own synchronous status register. This synchronous status information is transmitted to all other processors. Further, the transmitted synchronous status information is set in the synchronous receiving elements in all of the other processors. Subsequently, the processor which has terminated its processing last sets the synchronous status information in its status register. This synchronous status information is then transmitted to the synchronous receiving elements in all other processors. At this point, the synchronous detecting element in each processor detects all of the synchronous status information, corresponding to the number of processors, which have been received in the synchronous receiving element. Then, the processors shift to the next processing on the assumption that all the processors are now synchronized.

The conventional synchronous processing element includes a synchronous status register, a synchronous receiving element and a synchronous detecting element, each containing only the data "1". Therefore, only one process (one program) can be executed by one processor. Further, the conventional synchronous processing element is incapable of assigning a certain program to one group of processors to be synchronized among the group of processors and assigning another program to a second group of processors to be synchronized among the second group. For this reason, it is impossible to execute, with high efficiency, a plurality of parallel processing programs.

SUMMARY OF THE INVENTION

It is a primary object of the present invention, which has been devised in view of the points described above, to provide a synchronous processing method and apparatus capable of executing a plurality of parallel processing programs with a high efficiency.

A synchronous processing apparatus according to this invention comprises a plurality of processing elements for executing programs and a communication device through which information is transferred between the plurality of processing elements. Each processing element executes a process in a program in synchronization with other processing elements. Each processing element includes a synchronization combination storage element, a synchronous status storage element, a storage control element, a synchronous receiving element, a synchronous judging element and a processing shifting element.

The synchronization combination storage element stores synchronization combination information indicating a combination of the processing elements to be synchronized per program for processing the program by the indicated plurality of processing elements. The synchronous status storage element stores synchronous status information showing that a synchronous waiting status is reached when that processing element finishes executing a process. The storage control element causes the synchronous status storage element to store the synchronous status information and simultaneously transmits the synchronous status information to all other processing elements. The synchronous receiving element receives the transmitted synchronous status information. The synchronous judging element judges, on the basis of the synchronization combination information stored in the synchronization combination storage element and the received synchronous status information, whether the processing elements are synchronized. The processing shifting element, when the synchronous judging element judges that the processing elements are synchronized, shifts all the processing elements indicated by the synchronization combination information to the next process in a program corresponding to that synchronization combination information, so that all of the indicated processing elements are synchronized with each other.

Based on a synchronous processing method actualized by the apparatus described above, the program process is executed while each processing element becomes synchronized by transferring the status information between the plurality of processing elements. The processing elements are, e.g., processors and the communication device is, e.g., a communication network.

Further, a storage control element causes the synchronous status storage element to repeatedly and alternately store synchronous status information "1" and synchronous status information "0" per processing. The storage control element also causes the synchronization combination storage element to store the synchronization combination information. Further, the storage control element and the processing shift element may be provided in an instruction processing element for executing a plurality of instructions.

The synchronous receiving element for receiving the synchronous status information transmitted from all the processing elements and for outputting the received synchronous status information to the synchronous judging element may be a register, the bit number of which corresponds to the number of the plurality of processing elements. This register stores, when receiving the synchronous status information, the synchronous status information in bit strings corresponding to the plurality of processing elements.

The synchronous judging element includes a logic operation circuit for performing a logic operation between the synchronous status information given from the synchronous receiving element and the synchronization combination information given from the synchronization combination storage element, thereby determining whether the processing elements indicated by the synchronization combination information are synchronized.

The synchronization combination storage element is a register the bit number of which corresponds to the number of the plurality of processing elements. This register stores synchronous status information "1" in a bit string corresponding to all the processing elements indicated by the synchronization combination information among the bit strings corresponding to the plurality of processing elements.

The processing shifting element is provided with a synchronous indicating register for storing synchronous indicating information for indicating whether the processing elements indicated by the synchronization combination information are synchronized.

Provided further in the processing element is a control register for allocating this register to each processing element. The control register is a 1-bit register and allocates the processing elements to take two kinds of synchronization information in accordance with pieces of control information "1" and "0" for executing the processing of two programs. The synchronous receiving element is provided with a parity error detecting element for detecting a parity error of the information on the broadcasting line through which the information is broadcasted to the respective processing elements. The processing elements, when the parity error detecting element detects the 1-bit error, continues the processing without interrupting the processing of the programs. However, when further detecting a 1-bit error after detecting the former 1-bit error, the processing is interrupted in the processing element.

Furthermore, a synchronous processing apparatus according to another embodiment is constructed as follows. Each processing element includes a plurality of synchronous status storage elements, a storage control element, a plurality of synchronous judging elements and a processing shifting element. The plurality of synchronous status storage elements are provided corresponding to a plurality of programs. The synchronous status storage elements respectively store synchronous status information showing that a synchronization waiting status is reached when a self-processing element finishes the processing.

A storage control element causes each of the plurality of synchronous status storage elements to store the synchronous status information and transmits the synchronous status information to all the processing elements. A plurality of synchronous judging elements are provided corresponding to the plurality of synchronous status storage elements. The synchronous judging elements respectively judge whether the other processing elements are synchronized. A processing shifting element, when any one of the plurality of synchronous judging elements judges that the processing elements are synchronized, shifts all the processing elements to the next processing of the program corresponding to that synchronous judging element.

Provided further is a selecting element for selecting any one of synchronous processing of a plurality of programs and synchronous processing of one program, which is to be performed by the plurality of synchronous status storage elements and by the plurality of synchronous judging elements. The selecting element may be a register controlled by the storage control element. The synchronous judging element may include a plurality of synchronous receiving elements for receiving the synchronous status information transmitted from all the processing elements and storing the received synchronous status information.

A plurality of synchronous broadcasting lines may be further provided through which the synchronous status information is transmitted corresponding to the plurality of synchronous receiving elements and a mode circuit for connecting each broadcasting line to the synchronous receiving element corresponding to the broadcasting line when processing a plurality of programs and connecting each broadcasting line to one synchronous receiving element when processing one program.

The stored synchronization combination information indicates the combination of the processing elements to take the synchronization per program in order to process some programs by the plurality of processing elements. Stored subsequently is the synchronous status information showing that the synchronous waiting status is reached when the self processing element has finished the processing. The synchronous status information is transmitted to all other processing elements.

The next step is to judge whether the processing elements indicated by the synchronization combination information are synchronized. When receiving the synchronous status information from all the processing elements indicated by the synchronization combination information, all the processing elements indicated by the synchronization combination information are shifted to the next processing of the program corresponding to the synchronization combination information. That is, it is possible to designate the combination of the processing elements to take the synchronization per program on the basis of the synchronization combination information. Some parallel processing programs of a plurality of users can therefore be executed with high efficiency by the plurality of processing elements.

BRIEF DESCRIPTION OF THE DRAWINGS

Other objects and advantages of the present invention will become apparent during the following discussion in conjunction with the accompanying drawings, in which:

FIG. 6 is a diagram showing a configurational example of a synchronous mask register;

FIG. 7 is a diagram showing contents of the synchronous mask register when running two programs according to the first embodiment of this invention;

FIG. 12 is a diagram showing contents of a synchronous mask register and of a synchronous mask control register when running two programs in the second embodiment;

FIG. 14 is a diagram showing contents of the synchronous mask register and of the synchronous mask control register when running three programs;

FIG. 16 is a block diagram showing the processing of a program A in the third embodiment;

FIG. 17 is a block diagram illustrating a configuration of an synchronous processing element according to a fourth embodiment;

FIG. 19(a) is a flowchart showing the processing of subprogram C1 within one processor, FIG. 19(b) is a flowchart showing the processing of subprogram C2 within one processor;

FIG. 21 is a diagram showing a data format of a 2-process mode on a synchronous broadcasting line in the fifth embodiment;

FIG. 22 is a diagram showing a data format of a 1-process mode on the synchronous broadcasting line in the fifth embodiment;

DETAILED DESCRIPTION OF THE PREFERRED EMBODIMENTS

Figure 1:
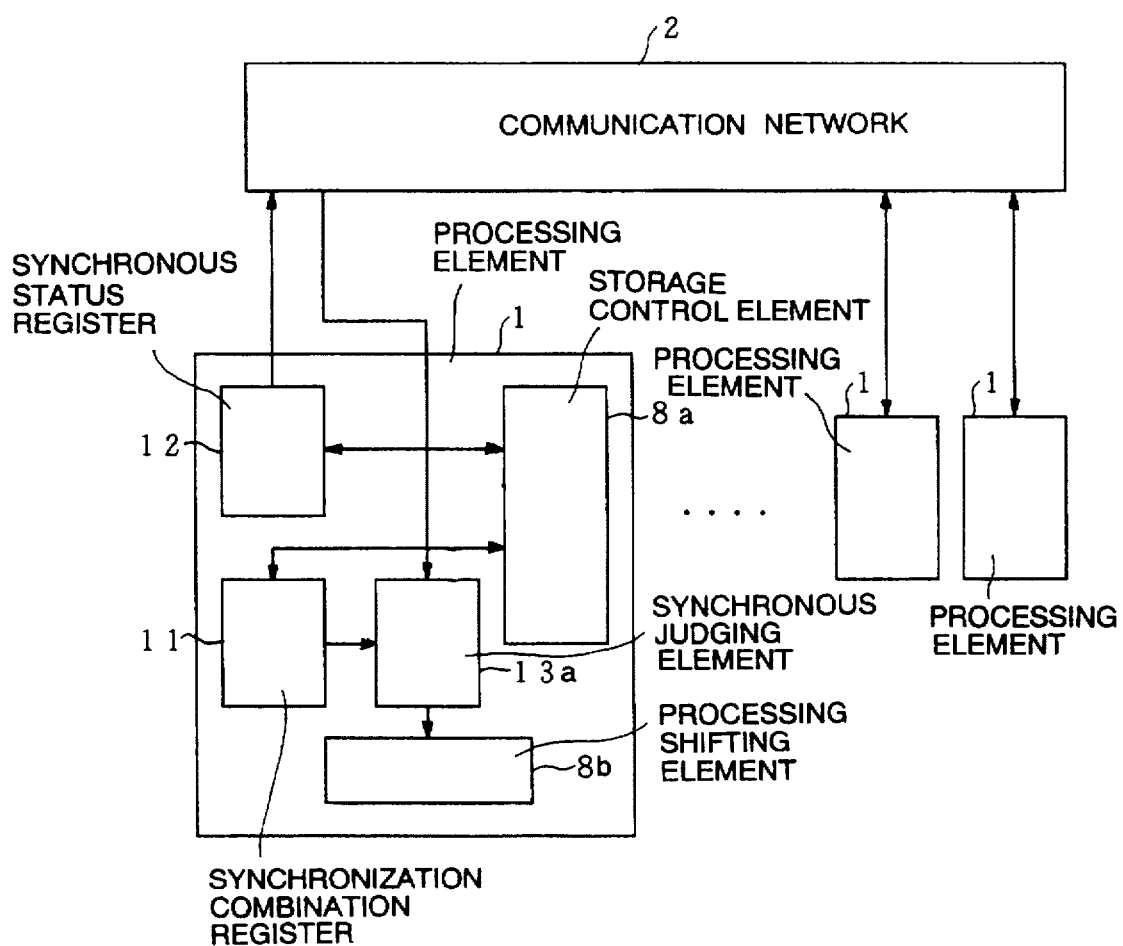
FIG. 1 is a block diagram showing the principle operation of a synchronous processing apparatus according to the present invention.
Figure 2:
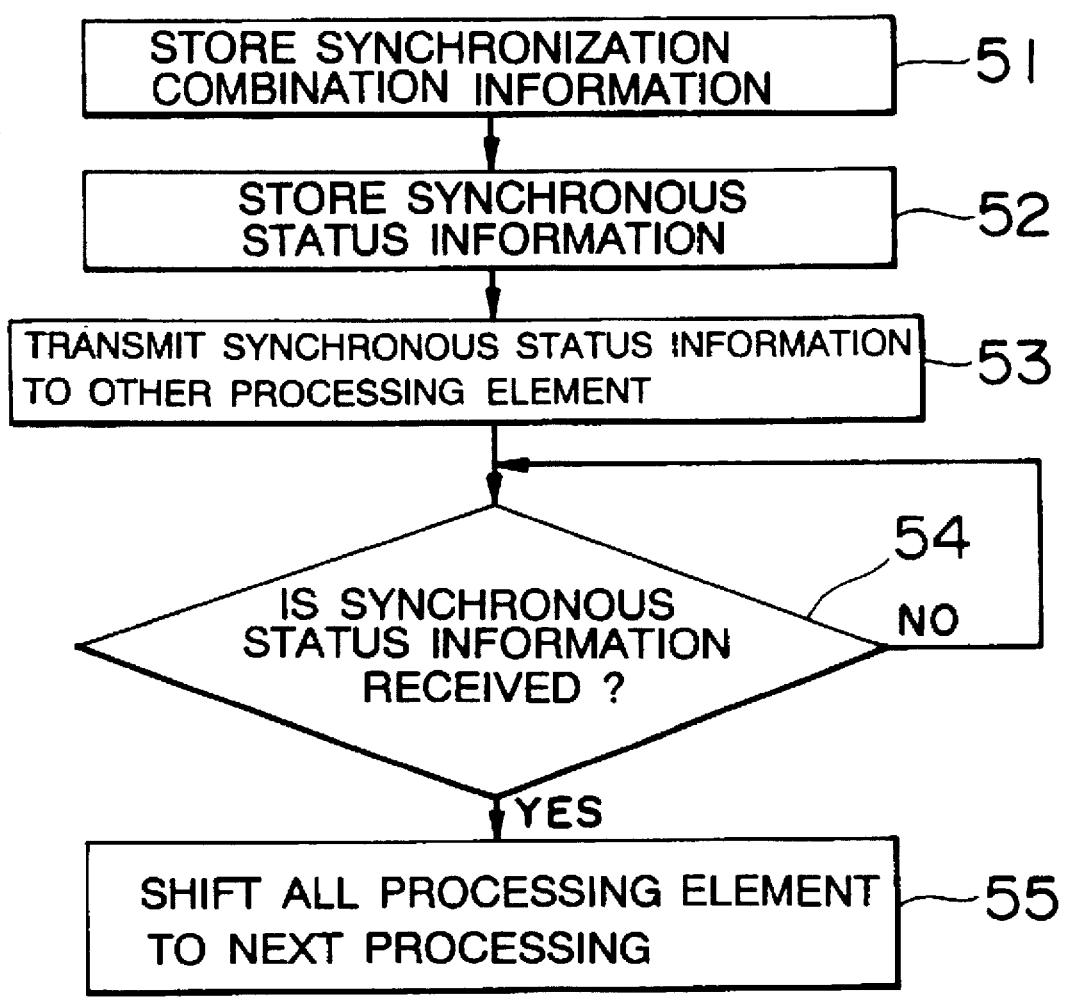
FIG. 2 is a flowchart showing the principle operation of a synchronous processing method according to this invention.

FIG. 1 illustrates a concept of a synchronous processing apparatus according to the present invention. Processing elements 1 communicate with each other through communication network 2. Each processing element 1 includes a synchronous status storage element 12, a synchronization combination storage element 11, a synchronous judging element 13a, a processing shifting element 8b and a storage control element 8a. FIG. 2 is a flowchart illustrating a concept of a synchronous processing method according to the present invention.

Figure 3:
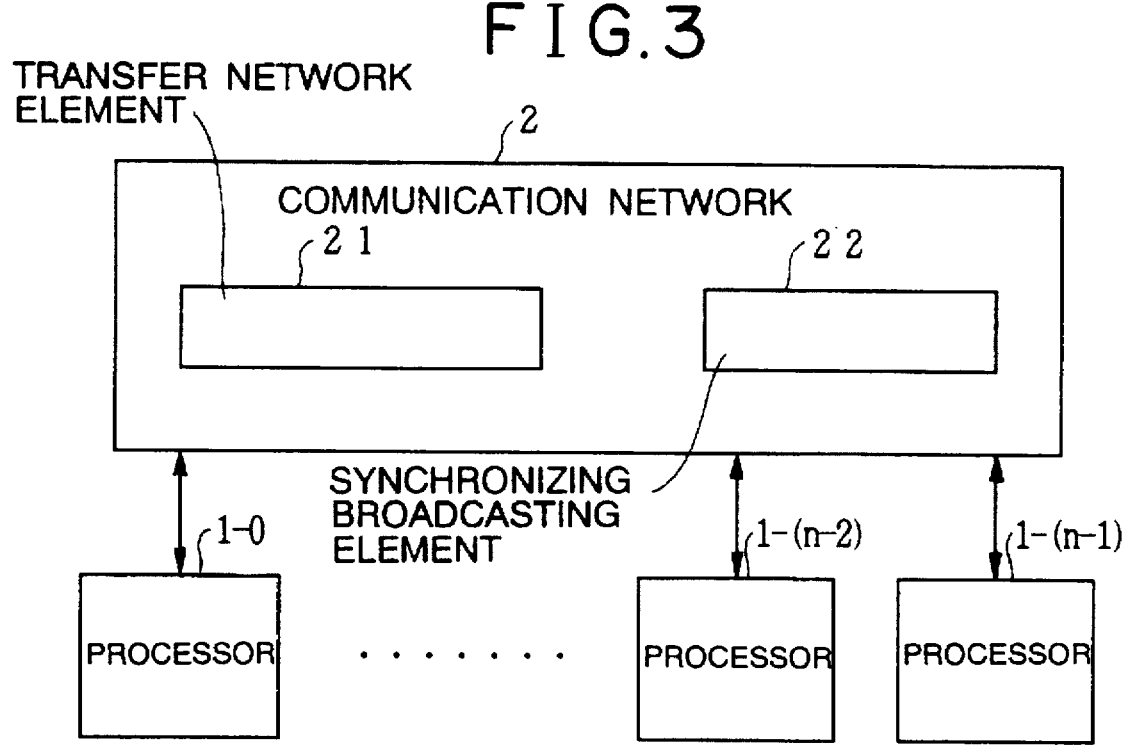
FIG. 3 is a block diagram illustrating an architecture of the synchronous processing apparatus according to a first embodiment of this invention.
Figure 4:
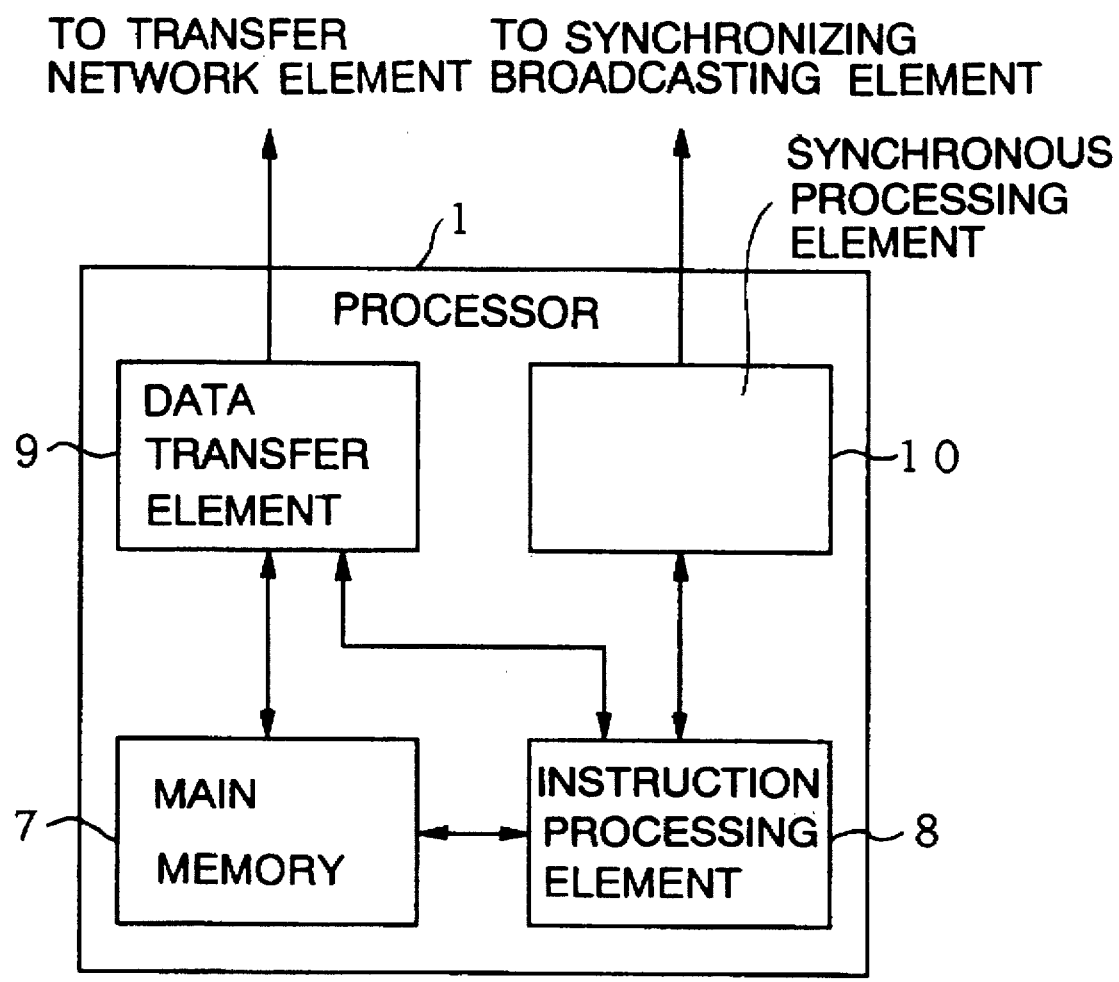
FIG. 4 is a block diagram showing a configuration of a processor.

Specific embodiments of the present invention will hereinafter be discussed. FIG. 3 is a block diagram showing an architecture of the synchronous processing apparatus in a first embodiment of this invention. FIG. 4 is a block diagram illustrating a configuration of a processor in the first embodiment.

As shown in FIG. 3, according to the first embodiment, the synchronous processing apparatus is provided with a plurality of processors for executing program instructions. The synchronous processing apparatus is also provided with a communication network 2 for connecting the plurality of processors 1-0~1-n to each other and transmitting/receiving data and information between the processors 1.

The communication network 2 includes a transfer network element 21 and a synchronizing broadcasting element 22. The transfer network element 21 effects a transfer of data to a data transfer element 9, shown in FIG. 4, provided in each of the processors 1-0~1-n. The synchronizing broadcasting elements 22 broadcasts a synchronous status of each of the processors 1-0~1-n to a synchronous processing element 10, shown in FIG. 4. Each of the processors 1a~1n, as shown in FIG. 4, includes a main memory 7, an instruction processing element 8, a data transfer element 9 and a synchronous processing element 10.

The main memory 7 stores a program including a plurality of instructions and also stores data. The instruction processing element 8 connected to the main memory 7 fetches an instruction out of the program of the main memory 7 and executes this instruction. The data transfer element 9 is connected to the main memory 7, the instruction processing element 8 and the transfer network element 21. The data transfer element 9 transfers the data between the main memory 7 and the transfer network element 21. Instruction processing element 8 corresponds to storage control element 8a and processing shifting element 8b of FIG. 7.

Figure 5:
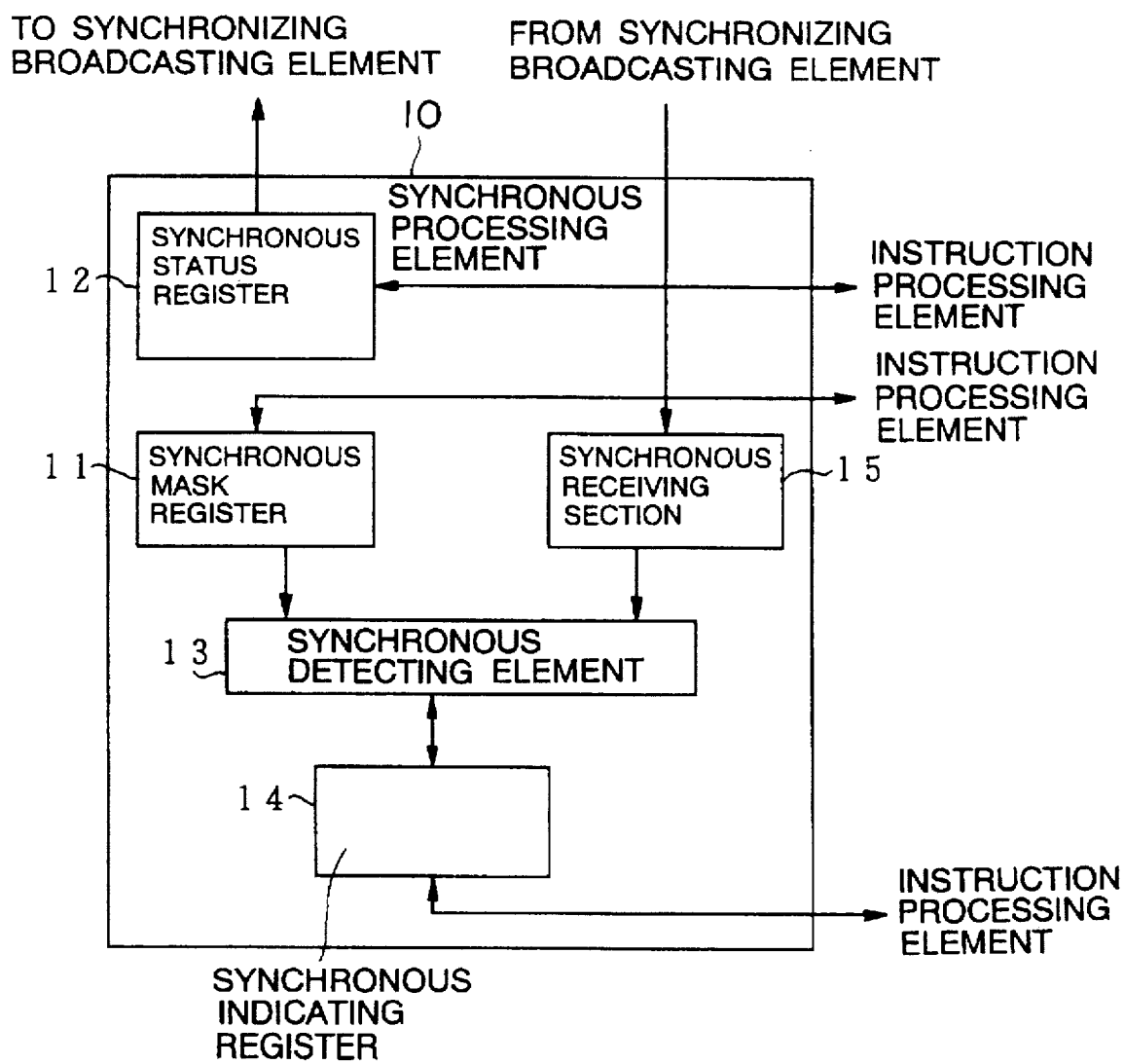
FIG. 5 is a block diagram showing a configuration of a synchronous processing element.

FIG. 5 is a block diagram showing a construction of the synchronous processing element 10. The synchronous processing element 10 is connected to the instruction processing element 8 and the synchronizing broadcasting element 22. The synchronous processing element 10 performs synchronous processing for each processor. Synchronous processing element 10 includes a synchronous status register 12, a synchronous mask register 11, a synchronous receiving element 15, a synchronous detecting element 13 and a synchronous indicating register 14.

The synchronous status register 12 is accessed by the instruction processing element 8. The synchronous status register 12 is defined as a 1-bit length register for storing synchronous status information indicating that a synchronization waiting status for synchronization with another processor is reached, when the processor completes an execution of a program process. The synchronous status register 12 stores, e.g., a piece of synchronous status information "1", in accordance with the program when reaching the status to be synchronized with another processor by ending a program process.

The synchronous mask register 11, corresponding to synchronization combination storage element 11 of FIG. 1, is accessed by the instruction processing element 8 and is an n-bit length register for storing synchronization combination information. Herein, the symbol n represents the number of processors. This synchronous mask register 11 stores, e.g., the synchronization combination information "1", with respect to other processors to be synchronized with its processor. The synchronous mask register 11, however, also stores synchronization combination information "0" with respect to other processors to not be synchronized with its processor.

The synchronous receiving element 15 is connected to the synchronizing broadcasting element 22. The synchronous receiving element 15 is a register for receiving the synchronous status information of the other processors synchronous status register 12 which is broadcasted from the synchronizing broadcasting element 22 and for retaining this synchronous status information.

The synchronous detecting element 13 is connected to the synchronous mask register 11 and the synchronous receiving element 15. Synchronous judging element 13a of FIG. 1 corresponds to synchronous detecting element 13, synchronous receiving element 15, and synchronous indicating register 14 of FIG. 5. Synchronous detecting element 13 is a combination circuit for detecting a status where the synchronous status information is all "1" and a status where the synchronous status information is all "0". The synchronous detecting element 13 transmits a set signal to the synchronous indicating register 14. The set signal is transmitted when the synchronous status information of all of the processors is "1". This synchronous status information corresponds to such a processor that the synchronization combination information of the synchronous mask register 11 becomes "1". Synchronous detecting element 13 sets "1" in synchronous indicating register 14 by a logic operation of the synchronization combination information "1" and the synchronous status information "1" from all of the processors to be synchronized. Instruction processing element 8 shifts to a next process by setting "1" in synchronous indicating register 14. Instruction processing element 8 then resets synchronous status register 12 to "0".

Further, the synchronous detecting element 13 transmits a reset signal to the synchronous indicating register 14 in the next process. The reset signal is transmitted when the synchronous status information is all "0". This synchronous status information corresponds to such a processor that the synchronization combination information of the synchronous mask register 11 becomes "1". Synchronous detecting element 13 resets synchronous indicating register 14 to "0" by the logic operation of the synchronization combination information "1" and the synchronous status information "0" from all of the processors to be synchronized in the next process. Instruction processing element 8 shifts to a next process by resetting synchronous indicating register 14 to "0". Instruction processing element 8 sets synchronous status register 12 to "1".

This way, synchronous status register 12 alternatively repeats the above-described set or reset action. Synchronous indicating register 14 also alternately repeats the above-described set or reset action.

The synchronous indicating register 14 is a 1-bit length register for indicating synchronous statuses of all the processors conceived as targets. The synchronous indicating register 14 is accessed by the instruction processing element 8 and set or reset by the synchronous detecting element 13.

FIG. 6 is a diagram illustrating an example of a configuration of the synchronous mask register 11. As illustrated in FIG. 6, a bit string i corresponds to a processor i.

Figure 8:
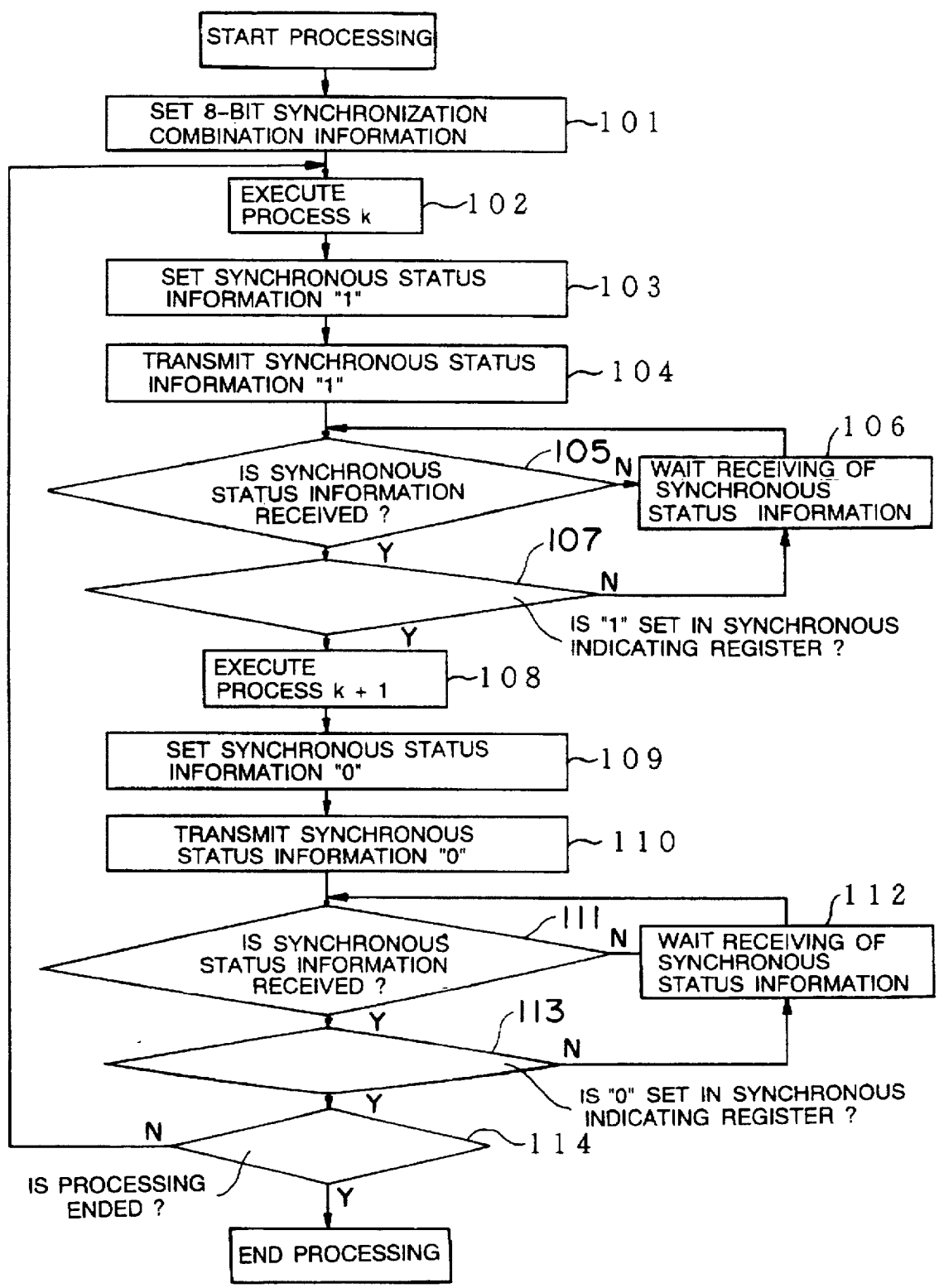
FIG. 8 is a flowchart showing the processing of a program A in the first embodiment.

Next, the synchronous processing method actualized by the above constructed synchronous processing apparatus will be explained. Discussed below is a description of the processes to be executed while synchronizing two different user's parallel programs, e.g., a program A and a program B. FIG. 7 is a diagram showing contents of the synchronous mask register 11 when running the two programs A and B. FIG. 8 is a flowchart showing the processing of the program A. As illustrated in FIG. 7, it is assumed that e.g., eight units of processors 1-0~1-7 are prepared. It is also presumed, in this example, that the program A is executed by the processors 1-0, 1-1, 1-3, 1-4, 1-5, while the program B is executed by the processors 1-2, 1-6, 1-7.

To start with, before the processors 1-0, 1-1, 1-3, 1-4, 1-5 execute the program A while being synchronized, an 8-bit pattern "11011100", indicating processors 1-0, 1-1, 1-3, 1-4, and 1-5, is set as a piece of synchronization combination information in the synchronous mask register 11 included in each of the processors 1-0, 1-1, 1-3, 1-4, 1-5 (step 101).

Further, before the processors 1-0, 1-1, 1-3, 1-4, 1-5 execute the program A while being synchronized, the synchronous status information of the synchronous status register 12 of each processor and the information of the synchronous indicating register 14 thereof are set to "0".

Next, the processors 1-0, 1-1, 1-3, 1-4, 1-5 start executing processing k (step 102). Herein, k is initially 1, however, its value is incremented when repeating the process. After each of the processors 1-0, 1-1, 1-3, 1-4, 1-5 where the program A is executed have finished their processing, the processors are at a status to take processor-to-processor synchronization on the program A. At this point, the instruction processing element 8 sets the synchronous status information of the synchronous status register 12 to "1" (step 103).

The synchronous status information "1" of the synchronous status register 12 is transmitted to the synchronizing broadcasting element 22 in the communication network 2 under control of the instruction processing element 8 (step 104). The synchronous status information "1" is broadcasted to all other processors from the synchronizing broadcasting element 22. The synchronous receiving elements 15 of the respective processors receive pieces of synchronous status information "1" of the synchronous status registers 12 of all the processors. Subsequently, the synchronous detecting element 13 performs a logic operation with respect to the synchronous status information of the synchronous receiving element 15 and the synchronization combination information of the synchronous mask register 11, thereby detecting synchronization (step 105). If synchronization is not detected, there is a waiting period for receiving the next synchronous status information (step 106). At this time, the instruction processing element 8 of each processor executing the program A has already set "1" in the synchronous status register 12. The instruction processing element 8, if some processes unnecessary for the synchronization with other processors remain unexecuted, executes those processes.

Then, the instruction processing element 8 monitors the synchronous indicating register 14 and judges whether or not 1 is set in the information of the synchronous indicating register 14 (step 107). Herein, if 1 is not set in the information of the synchronous indicating register 14, there is a waiting period until the information becomes 1 (step 106).

Next, when receiving the synchronous information from all the processors indicated by the synchronization combination information, the information of the synchronous indicating register 14 becomes "1". The action thereof will be explained below.

Figure 9:
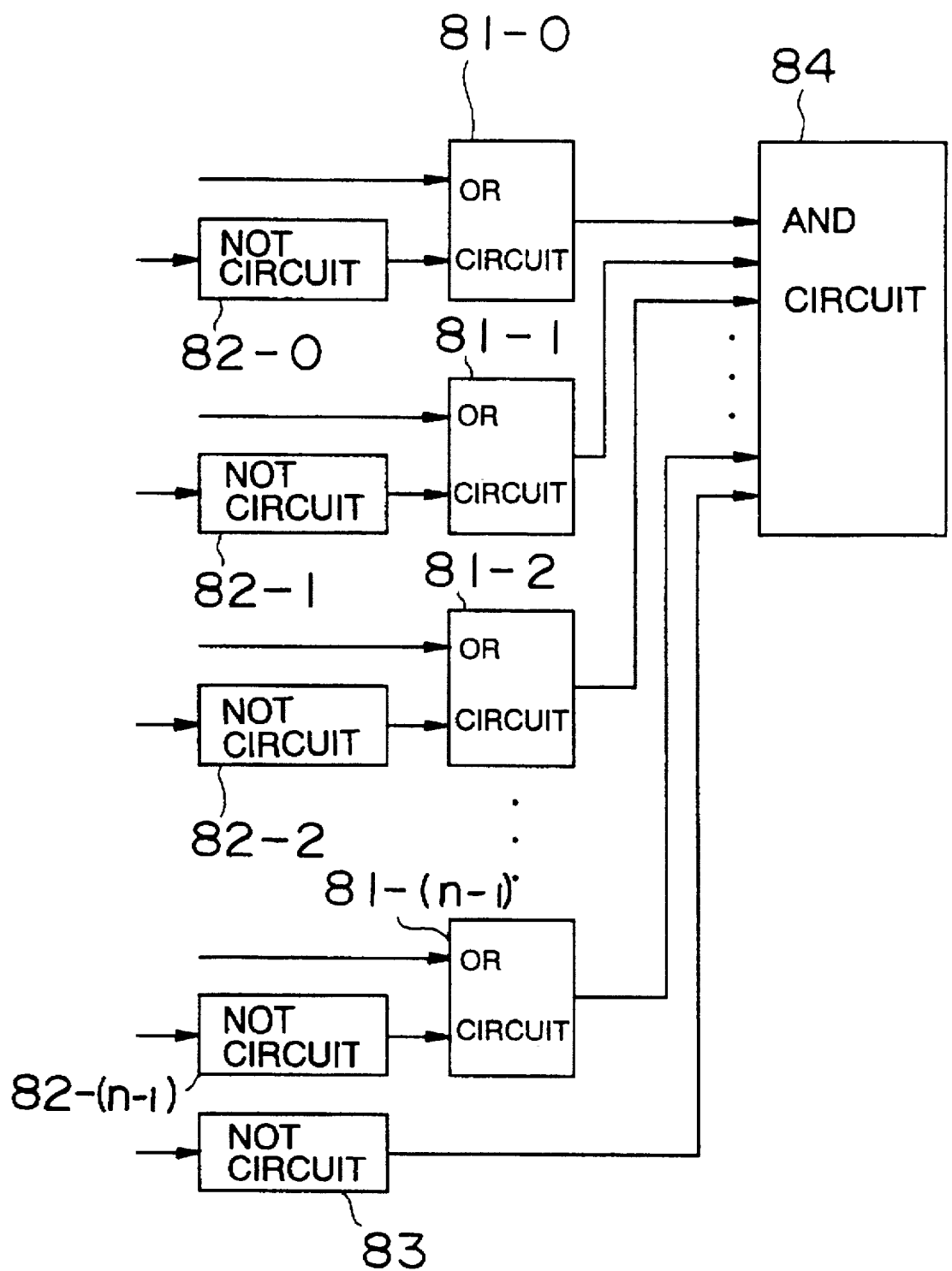
FIG. 9 is a block diagram illustrating a configuration of a synchronous detecting element for setting "1" in a synchronous indicating register.

FIG. 9 is a block diagram showing a configuration of the synchronous detecting element 13 for setting "1" in the synchronous indicating register 14. Provided in FIG. 9 are OR circuits 81-0~81-(n−1), NOT circuit 81-0~82-(n−1), a NOT circuit 83 and an AND circuit 84.

The synchronous status information of the processors 1~0 1-(n−1) which has been outputted from the synchronous receiving element 15 is inputted to the corresponding OR circuits 81-0~81-(n−1). For instance, the synchronous status information of the processor 1-1 is inputted to the OR circuit 81-1 from the synchronous receiving element 15.

Synchronization combination information "11011100" from bit 0 to bit n−1 which has been outputted from the synchronous mask register 11 is inputted to the corresponding NOT circuits 82-0~82-(n−1). Further, information "0" from the synchronous indicating register 14 is inputted to the NOT circuit 83.

Then, in the eight processors shown in this embodiment, when the synchronous status information of the processors 1-0, 1-1, 1-3, 1-4, 1-5 is all "1" (irrespective of statuses of other processors), "1" is set in the synchronous status information of the processor 1-0 which is given from the synchronous receiving element 15 and when the synchronization combination information of the synchronous mask register 11 is "1", an output of the OR circuit 81-0 is 1. Further, when the synchronous status information of the processor 1-2 which is given from the synchronous receiving element 15 is "0", and, when the synchronization combination information of the synchronous mask register 11 is "0", an output of the OR circuit 81-2 is 1.

Hence, if pieces of the synchronous status information of the processors 1-0, 1-1, 1-3, 1-4, 1-5 all become "1", the outputs of all the OR circuits are "1", and an output of the AND circuit 84 comes to "1". Accordingly, "1" is set in the synchronous indicating register 14.

Next, when the information of the synchronous indicating register 14 becomes "1", the instruction processing element 8 recognizes that all the processors 1-0, 1-1, 1-3, 1-4, 1-5 relative to the program A have reached the synchronous status. Next processing k+1 consecutively continues (step 108).

Next, the instruction processing element 8, when reaching a processor-to-processor synchronization status, sets "0" in the synchronous status register 12 (step 109). The synchronous status information "0" of the synchronous status register 12 is transmitted to the synchronizing broadcasting element 22 on the network 2 (step 110). The synchronous status information "0" is broadcasted to all other processors from the synchronizing broadcasting element 22. The synchronous receiving elements 15 of the respective processors receive pieces of synchronous status information "0" of the synchronous status registers 12 of all other processors. Then, the synchronous detecting element 13 executes the logic operation with respect to the synchronous status information of the synchronous receiving element 15 and the synchronization combination information of the synchronous mask register 11, thereby detecting the synchronization (step 111). Herein, if the synchronization is not detected, there is a waiting period for receiving the synchronous status information (step 112). At this time, the instruction processing element 8 of each processor executing the program A has already set "0" in the synchronous status register 12. The instruction processing element 8, if some processes unnecessary for the synchronization with other processors remain unexecuted, executes those processes.

Then, the instruction processing element 8 monitors the synchronous indicating register 14 and judges whether or not 0 is set in the information of the synchronous indicating register 14 (step 113). Herein, if 0 is not set in the information of the synchronous indicating register 14, there is a waiting period until the information becomes 0 (step 114).

Next, when receiving the synchronous information from all the processors indicated by the synchronization combination information, the information of the synchronous indicating register 14 becomes "0". The action thereof is explained below.

Figure 10:
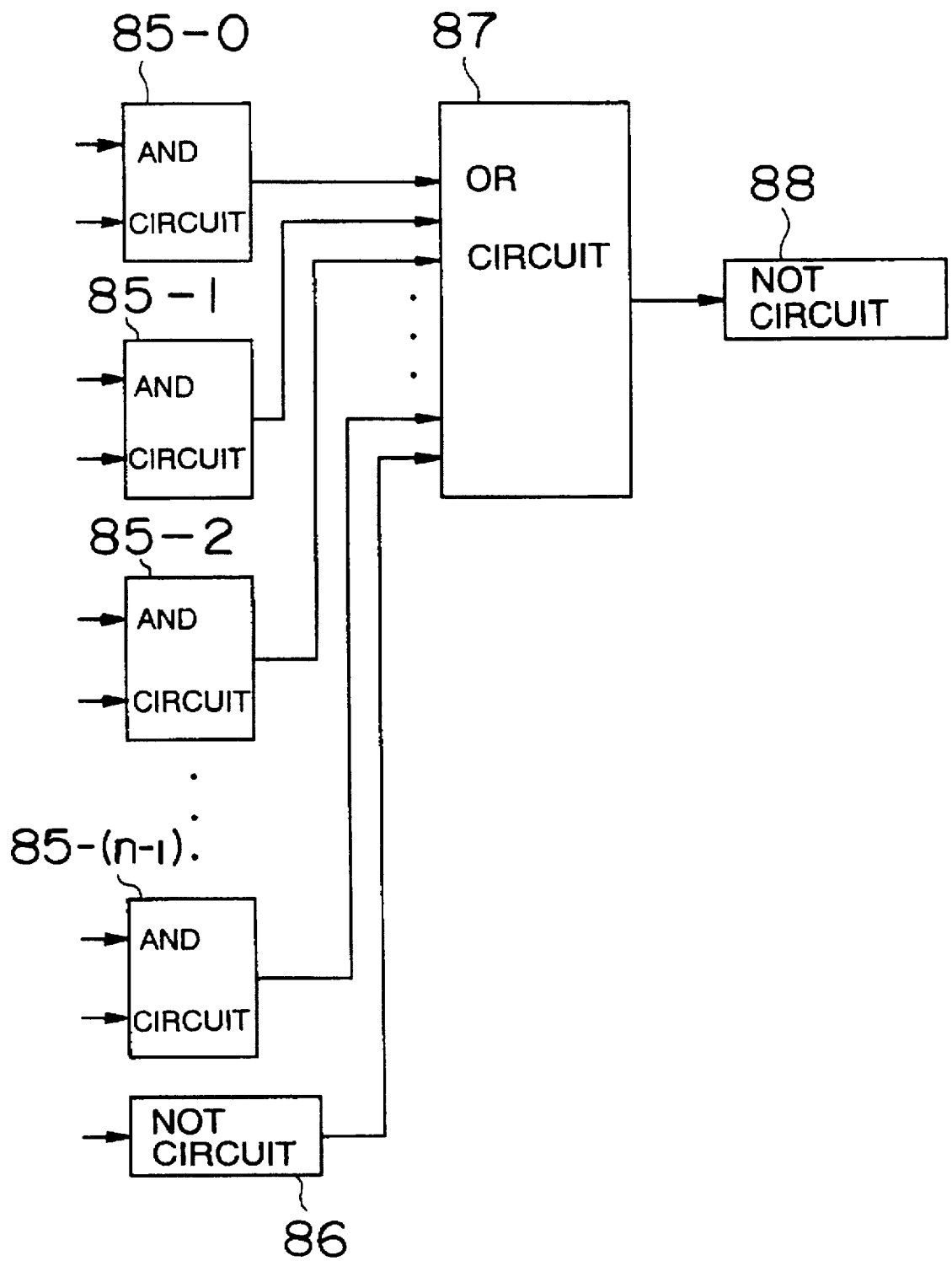
FIG. 10 is a block diagram showing a configuration of a synchronous detecting element for setting "0" in the synchronous indicating register.

FIG. 10 is a block diagram showing a configuration of the synchronous detecting element 13 for setting "0" in the synchronous indicating register. Provided in FIG. 10 are AND circuits 85-0~85-(n−1), a NOT circuit 86, an OR circuit 87 and a NOT circuit 88.

The synchronous status information of the processors 1-0~1-(n−1) which has been outputted from the synchronous receiving element 15 is inputted to the corresponding AND circuits 85-0~85-(n−1). Synchronization combination information "11011100" from bit 0 to bit n−1 which has been outputted from the synchronous mask register 11 is inputted to the corresponding AND circuits 85-0~85-(n−1). Further, information "1" from the synchronous indicating register 14 is inputted to the NOT circuit 86.

Then, in the eight processors shown in this embodiment, when the synchronous status information of the processors 1-0, 1-1, 1-3, 1-4, 1-5 is all "0", "0" is set in the synchronous indicating register 14. It is because the output of the OR circuit 87 becomes 1, and an output of the NOT circuit 88 comes to "0".

Next, when the information of the synchronous indicating register 14 becomes "0", the instruction processing element 8 recognizes that all the processors 1-0, 1-1, 1-3, 1-4, 1-5 relative to the program A reach the synchronous status. Subsequently, the next processing proceeds. Note that whether or not the processes are all finished is judged at this moment (step 114). Herein, if the processes are not all finished, the action goes back to step 101. Processes from steps 101~114 are executed. Thus, processes in the program proceed in parallel by repeating the synchronization based on the synchronous status information "1" and the synchronization based on the synchronous status information "0".

On the other hand, the program B is allocated to the processors 1-2, 1-6, 1-7 absolutely independently of the action of the program A described above. A bit pattern "00100011" is set as synchronization combination information in the synchronous mask registers 11 of the processors 1-2, 1-6, 1-7. Parallel processing of the program B also proceeds in the same way as program A in accordance with a processing flow shown in FIG. 8. This processing proceeds while taking the synchronization based on the synchronous status information "1" and the synchronization based on the synchronous status information "0". In this manner, the processing of the programs A and B can be highly efficient, while repeating the synchronous processing absolutely independently of each other.

Described above is the synchronous mask register for storing the synchronization combination information indicating a combination of the processors to be synchronized per program. It is therefore possible to execute the parallel processing programs of a plurality of users which are less than the number of the processors.

Next, the second embodiment of the present invention will be discussed. A change in the configuration of the synchronous processing element 10 is a characteristic point of the second embodiment in contrast with the first embodiment. The configurations other than the synchronous processing element are the same as those in the first embodiment. The same elements as those shown in the first embodiment are marked with like numerals, and detailed explanations thereof will be omitted.

Figure 11:
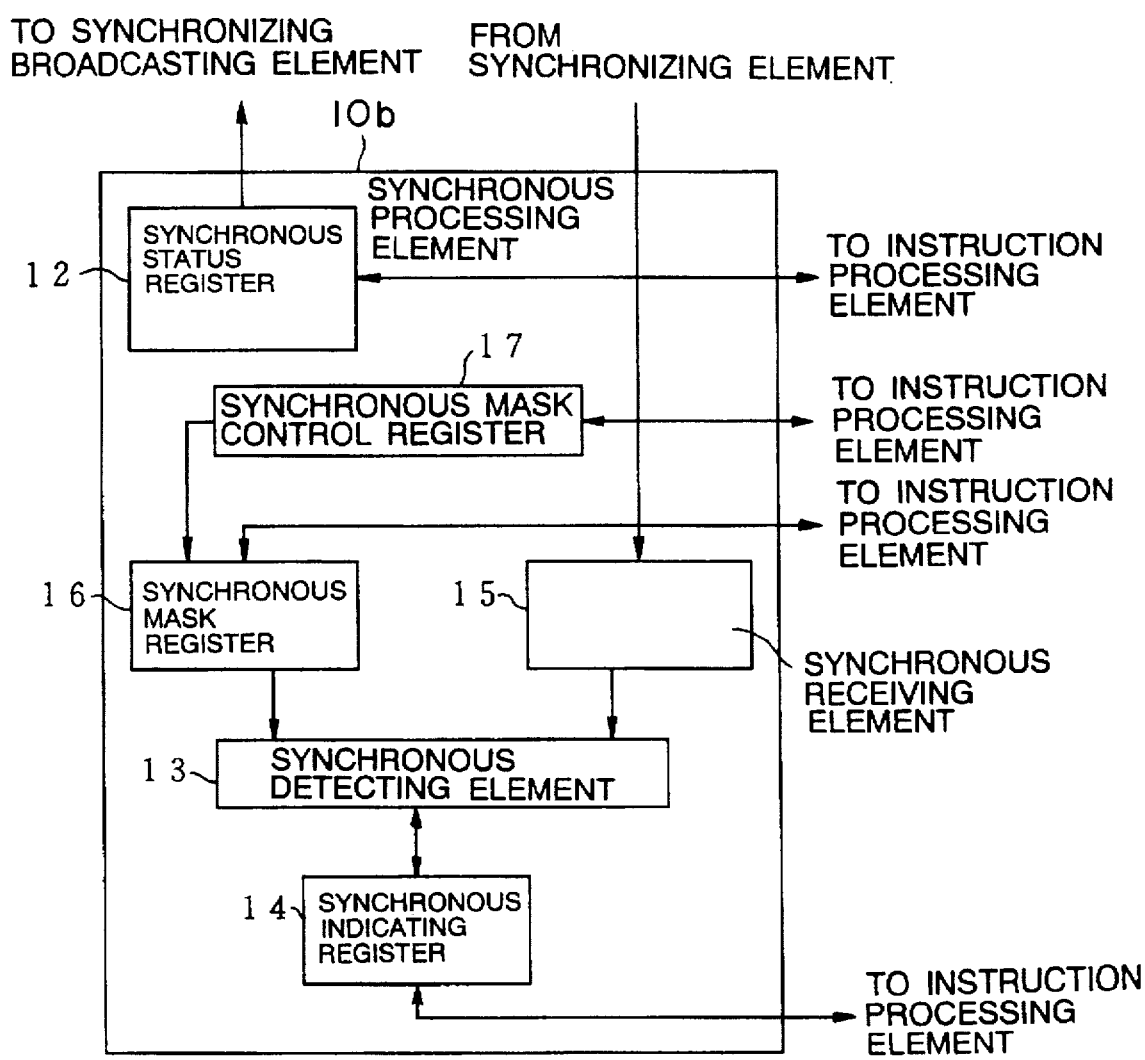
FIG. 11 is a block diagram illustrating a configuration of a synchronous processing element in a second embodiment of the present invention.

FIG. 11 is a block diagram showing a construction of a synchronous processing element 10b in the second embodiment. Referring to FIG. 11, a synchronous mask register 16 is accessed from the instruction processing element 8. The synchronous mask register 16 is a register having a bit length corresponding to one-half of the number of the processors. The synchronous mask register 16 designates the relevant processor and a processor to be synchronized. In accordance with the second embodiment, for instance, the number of the processors is 8, and hence the synchronous mask register 16 may be a 4-bit length register, corresponding to four processors to be synchronized. The processor corresponding to a bit "1" among 4 bits executes the program.

A synchronous mask control register 17 is a 1-bit length register accessed by the instruction processing element 8. Control information "1" or "0" is required for designating one of the program A executed by the four processors 1-0~1-3, for example, and the program B executed by the four processors 1-4~1-7, for example. Synchronous mask control register 17 stores pieces of control information "1" and "0" for designating one of the two programs executed by the plurality of processors. This synchronous mask control register 17 designates the program A of two programs A, B executed by the eight processors in accordance with the control information "0". Synchronous mask control register 17 designates the program B of the two programs A, B executed by the eight processors in accordance with the control information "1".

Figure 13:
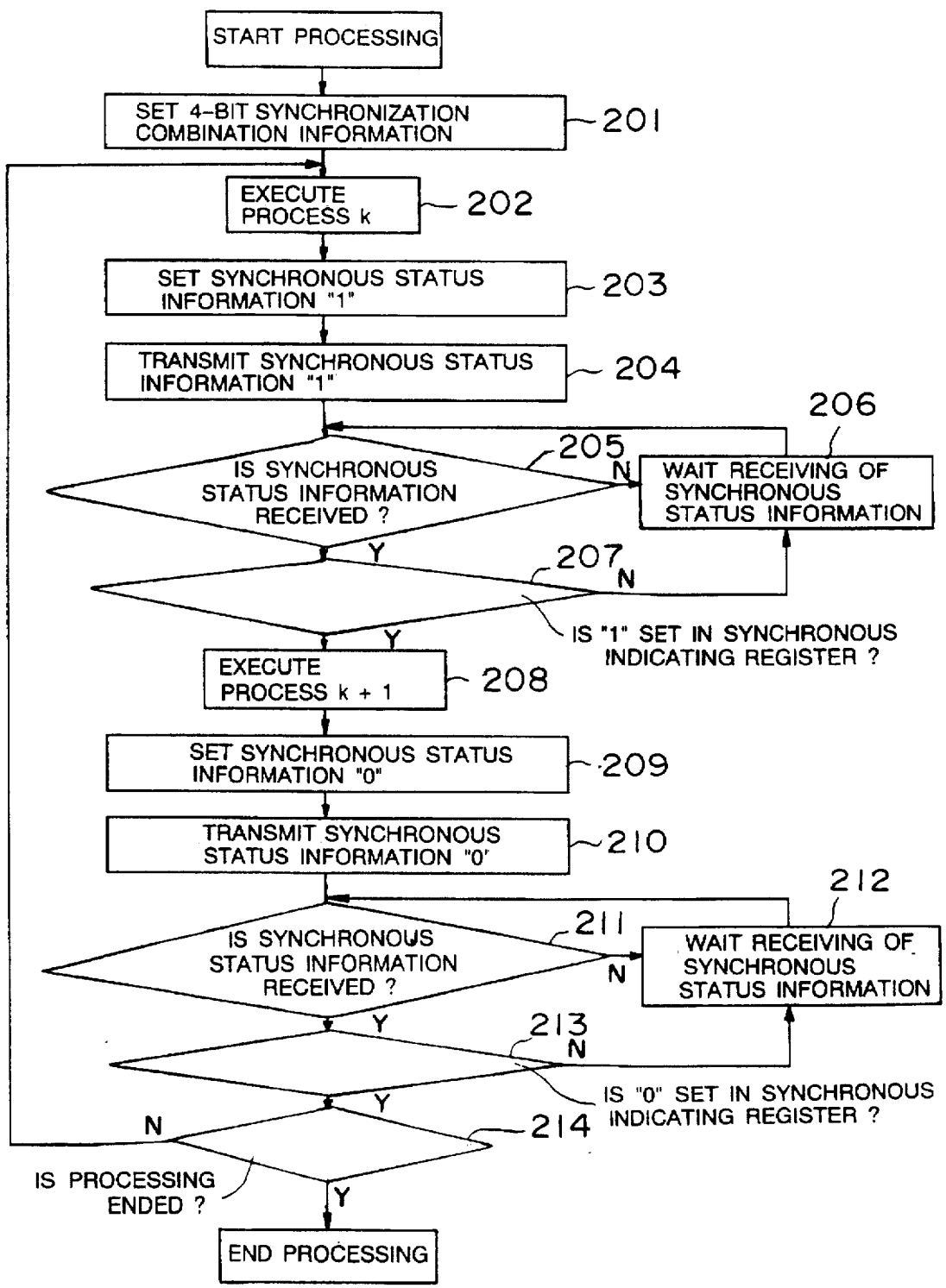
FIG. 13 is a flowchart showing the processing of a program A in the second embodiment.

Next, the synchronous processing method actualized by the above constructed synchronous processing apparatus will be explained. Given herein is a description of the processes of two different user's parallel programs, i.e., the programs A and B, while being synchronized. FIG. 12 is a diagram showing an example of contents of the synchronous mask register 16 when running the two programs A and B. FIG. 13 is a flowchart showing the processing of the program A.

As illustrated in FIG. 12, it is assumed that e.g., eight units of processors 1-0~1-7 are prepared. It is also presumed that the program A is executed by the processors 1-0, 1-1, 1-2, 1-3 in accordance with synchronization combination information "1110" among the processors 1-0, 1-1, 1-2, 1-3. The program B is executed by the processors 1-4, 1-5, 1-6, 1-7 in accordance with synchronization combination information "0111" among the processors 1-4, 1-5, 1-6, 1-7. Four-bit synchronous mask registers 16 are provided in the eight processors 1-0~1-7.

At the first onset, before the processors 1-0, 1-1, 1-2, 1-3 execute the program A while taking the synchronization, a bit pattern "1110" is set as a piece of synchronization combination information in the synchronous mask register 16 included in each of the processors 1-0, 1-1, 1-2, 1-3 (step 201). "0" is set in the synchronous mask control register 17, whereby 4 bits of the synchronous mask register 16 can correspond to the processors 1-0, 1-1, 1-2, 1-3. Further, before the processors 1-0, 1-1, 1-2, 1-3 execute the program A while being synchronized, both of values of the synchronous status register 12 and the synchronous indicating register 14 of each processor are set to "0".

Next, the processors 1-0, 1-1, 1-2, 1-3 start executing the process of program A (step 202).

Each of the processors 1-0, 1-1, 1-2, 1-3 in which the program A is being executed sets, when a status to be synchronized in program A is reached, "1" in their synchronous status register 12 (step 203).

The synchronous status information "1" of the synchronous status register 12 is transmitted to the synchronizing broadcasting element 22 in the communication network 2 (step 204). The synchronous status information "1" is broadcasted to all other processors from the synchronizing broadcasting element 22. The synchronous receiving elements 15 of the respective processors receive pieces of synchronous status information "1" of the synchronous status registers 12 of all the processors. Subsequently, the synchronous detecting element 13 performs a logic operation with respect to the synchronous status information of the synchronous receiving element 15 and the synchronization combination information of the synchronous mask register 16, thereby detecting the synchronization (step 205). Herein, if the synchronization is not detected, there is a waiting period for receiving the synchronous status information (step 206). The instruction processing element 8, see FIG. 4, of each processor executing the program A eventually sets "1" in the synchronous status register 12. The instruction processing element 8, if the processes unnecessary for the synchronization with other processors remain unexecuted, executes those processes.

Then, the instruction processing element 8 monitors the synchronous indicating register 14 and judges whether or not 1 is set in the information of the synchronous indicating register 14 (step 207). Herein, if 1 is not set in the information of the synchronous indicating register 14, there is a waiting period until the information becomes 1 (step 206). Next, when receiving the synchronous information from all the processors indicated by the synchronization combination information, the information of the synchronous indicating register 14 becomes "1". The action thereof is the same as that shown in FIG. 9. Then, in the eight processors shown in this embodiment, when the synchronous status information of the processors 1-0, 1-1, 1-2 is all "1", "1" is set in the synchronous indicating register 14.

When the information of the synchronous indicating register 14 becomes "1", there is recognized that all the processors 1-0, 1-1, 1-2, 1-3 associated with the program A have reached the synchronous status. Herein, the recognition is such that synchronization has been taken regardless of the synchronization of the processor 1-3, because the synchronization combination information of the synchronous mask register corresponding to the processor 1-3 is "0". Then, the next process k+1 consecutively continues (step 208).

The processors aligned to the program A are the processors 1-0, 1-1, 1-2, 1-3. The actual program A is executed by the processors 1-0, 1-1, 1-2. At this time, the synchronization combination information is "1110". High-order 3-bit "1" of this synchronization combination information corresponds to the processors 1-0, 1-1, 1-2. Low-order 1 bit corresponds to the processor 1-3. Note that the processors aligned to the program B are the processors 1-4, 1-5, 1-6, 1-7. When the synchronous status information of the processors 1-0, 1-1, 1-2 is all "1", synchronous indicating register 14 is set with "1". Instruction processing element 8 thereby recognizes the synchronism even if the processor 1-3 does not synchronize with the processors 1-0, 1-1, 1-2.

In accordance with the program A, when reaching a time required for taking the processor-to-processor synchronization, "0" is set in the synchronous status register 12 (step 209). The synchronous status information "0" of the synchronous status register 12 is transmitted to the synchronizing broadcasting element 22 in the network 2 (step 210). The synchronous status information "0" is broadcasted to all other processors from the synchronizing broadcasting element 22. The synchronous receiving elements 15 of the respective processors receive pieces of synchronous status information "0" of the synchronous status registers 12 of all other processors. Then, the synchronous detecting element 13 executes the logic operation with respect to the synchronous status information of the synchronous receiving element 15 and the synchronous mask register 16, thereby detecting the synchronization (step 211). Herein, if the synchronization is not detected, there is a waiting period for receiving the synchronous status information (step 212). At this time, the instruction processing element 8 of each processor executing the program A has already set "0" in the synchronous status register 12. The instruction processing element 8, if some processes unnecessary for the synchronization with other processors remain unexecuted, executes those processes.

Then, the instruction processing element 8 monitors the synchronous indicating register 14 and judges whether or not 0 is set in the information of the synchronous indicating register 14 (step 213). Herein, if 0 is not set in the information of the synchronous indicating register 14, there is a waiting period until the information becomes 0 (step 212). Next, when receiving the synchronous information from all the processors indicated by the synchronization combination information, the information of the synchronous indicating register 14 becomes "0". The action thereof is the same as that shown in FIG. 10.

When the value of the synchronous indicating register 14 becomes "0", there is recognized that all the processors 1-0, 1-1, 1-2, 1-3 relative to the program A have reached the synchronous status. The next processing is consecutively processed. Furthermore, whether or not the processes in program A are all finished is judged at this moment (step 214). Herein, if the processes are not all finished, the action goes back to step 201. Processes form steps 201~214 are executed.

Thus, the processing of program A by the processors 1-1, 1-2, 1-3 and 1-4 proceeds in parallel by repeating the synchronization based on the synchronous status information "1" and the synchronization based on the synchronous status information "0".

On the other hand, the programs B is allocated to the processors 1-4, 1-5, 1-6, 1-7 absolutely independently of the action of the program A described above. Synchronization combination information "0111" is set in the synchronous mask registers 16 of the processors 1-4, 1-5, 1-6, 1-7, while a bit pattern "1" is set in the synchronous mask control register 17. "1" is set in the synchronous mask control register 17, whereby 4 bits of the synchronous mask register 16 can correspond to the processors 1-4, 1-5, 1-6, 1-7. Parallel processing of the program B also proceeds as in the same way as program A while taking the synchronization based on the synchronous flag "1" and the synchronization based on the synchronous flag "0".

In this manner, the processing of the programs A and B are highly efficient while repeating the synchronous processing of programs A and B absolutely independently of each other. As discussed above, the synchronous processing apparatus of the second embodiment for effecting the processor-to-processor synchronization includes a smaller number of the synchronous mask registers 16 than the number of the processors, the register 16 serving to designate a combination of the processors to take the synchronization. The synchronous mask register 16 is controlled by the synchronous mask control register 17. A plurality of user's parallel processing programs can be executed at high efficiency through the synchronous mask registers, the number of which is smaller than the number of the processors.

Further, when executing two or more programs in parallel, the following steps may be performed. For instance, as illustrated in FIG. 14, when executing three programs, the synchronous mask control register 17 involving the use of a 2-bit length register stores pieces of 2-bit information "00", "01", "10". The synchronous mask control register 17 allocates "00" to the synchronous mask registers of the processors 1-0~1-3. The synchronous mask control register allocates "01" to the synchronous mask registers of the processors 1-4~1-7 and "10" to the synchronous mask registers of the processors 1-8~1-11. The three programs can be thereby executed in parallel.

Figure 15:
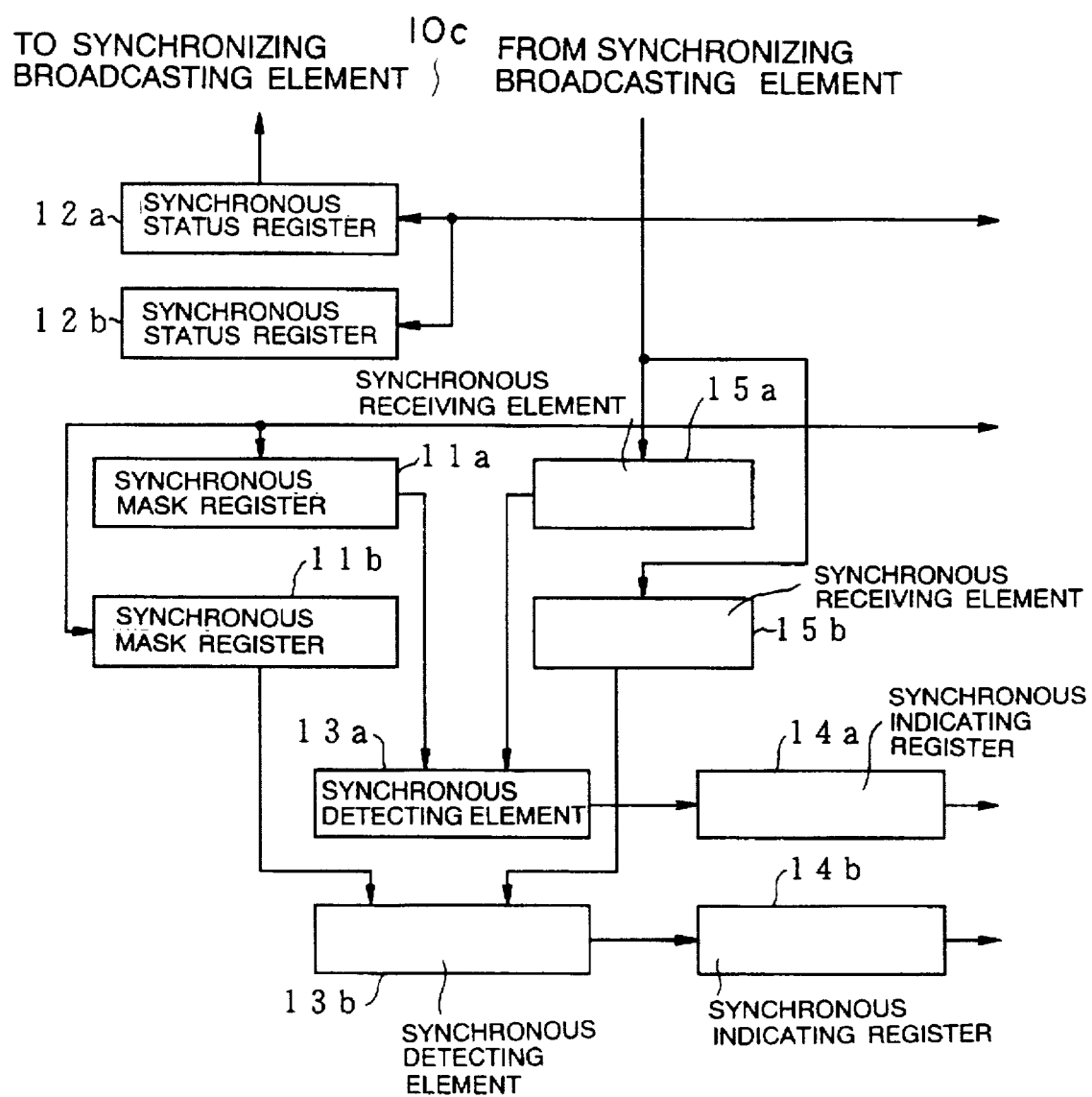
FIG. 15 is a block diagram showing a configuration of a synchronous processing element according to a third embodiment of this invention.

FIG. 15 is a block diagram showing a construction of a synchronous processing element 10c in third embodiment.
FIG. 16 is a flowchart showing processes of the program A in the third embodiment.

The synchronous processing element 10c in the embodiment 3 includes synchronous status registers 12a and 12b, synchronous mask registers 11a and 11b, synchronous receiving elements 15a and 15b, synchronous detecting elements 13a and 13b and synchronous indicating registers 14a and 14b. Then, one group of elements and registers 11a, 12a, 13a, 14a, and 15a are employed for the synchronous processing of the program A, while the other group of elements and registers 11b, 12b, 13b, 14b, 15b are for the synchronous processing of the program B.

Referring to FIG. 15, a synchronous status register 12a, a synchronous mask register 11a, a synchronous receiving element 15a, a synchronous detecting element 13a and a synchronous indicating register 14a are provided for executing the processes of the program A while being synchronized. A synchronous status register 12b, a synchronous mask register 11b, a synchronous receiving element 15b, a synchronous detecting element 13b and a synchronous indicating register 14b are provided for executing the processes of the program B while being synchronized. Further, the synchronous status registers etc. are provided in two's. Hence, the number of the processors provided in the third embodiment is one-half of the number of the processors provided in the first embodiment.

Next, the synchronous processing method actualized by the above constructed synchronous processing apparatus will be explained. Given herein is a description of the processes wherein two different user's parallel programs, i.e., the programs A and B are executed while being synchronized. It is assumed that e.g., four units of processors 1-0~1-3 are prepared. It is also presumed that both of the programs A and B are executed by the processors 1-0, 1-1, 1-2, 1-3. To begin with, before the processors 1-0, 1-1, 1-2, 1-3 execute the program A while taking the synchronization, a bit pattern "1111" is set in the synchronous mask registers 11a included in each of the processors 1-0, 1-1, 1-2, 1-3 (step 301). Further, before the processors 1-0, 1-1, 1-2, 1-3 execute the program A while taking the synchronization, both values of the synchronous status register 11a and the synchronous indicating register 14a of each processor are set to "0".

Next, the processors 1-0, 1-1, 1-2, 1-3 start executing the process k (step 302). Each of the processors 1-0, 1-1, 1-2, 1-3 in which the program A is being executed sets, when a status to take the synchronization on the program A is reached, "1" in the synchronous status register 12a (step 303). The synchronous status information "1" of the synchronous status register 12a is transmitted to the synchronizing broadcasting element 22 on the communication network 2 (step 304). The synchronous status information "1" is broadcasted to all other processors from the synchronizing broadcasting element 22. The synchronous receiving elements 15a of the respective processors receive pieces of synchronous status information "1" of the synchronous status registers 12a of all the processors. Subsequently, the synchronous detecting element 13a performs a logic operation with respect to the synchronous status information of the synchronous receiving element 15a and the synchronization combination information of the synchronous mask register 11a, thereby detecting the synchronization (step 305). Note that if the synchronization is not detected, there is a waiting period for receiving the synchronous status information (step 306). Judged further is whether the value of the synchronous indicating register 14a is set to 1 or not (step 307). Note that the synchronous detecting element for setting "1" in the synchronous indicating register 14a is constructed the same as in FIG. 9.

Then, in the four processors shown in this embodiment, when the synchronous status information of the processors 1-0, 1-1, 1-2, 1-3 is all "1", "1" is set in the synchronous indicating register 14a. When a value of the synchronous indicting register 14a becomes "1", there is recognized that all the processors 1-0, 1-1, 1-2, 1-3 associated with the program A reach the synchronous status. The next process k+1 consecutively continues (step 308). In accordance with the program A, when reaching a time required for taking the processor-to-processor synchronization, "0" is set in the synchronous status register 12a (step 309).

The synchronous status information "0" of the synchronous status register 12a is transmitted to the synchronizing broadcasting element 22 on the network 2 (step 310). The synchronous status information "0" is broadcasted to all other processors from the synchronizing broadcasting element 22. The synchronous receiving elements 15a of the respective processors receive pieces of synchronous status information "0" of the synchronous status registers 12a of all other processors. Then, the synchronous detecting element 13a executes the logic operation with respect to the synchronous status information of the synchronous receiving element 15a and the synchronization combination information of the synchronous mask register 11a, thereby detecting the synchronization (step 311).

Judged further is whether or not the value of the synchronous indicating register 14a is set to 0 (step 313). The synchronous detecting element for setting "0" in the synchronous indicating register 14a is constructed the same as in FIG. 10. When the value of the synchronous indicating register 14a becomes "0", it is recognized that all the processors 1-0, 1-1, 1-2, 1-3 associated with the program A reach the synchronous status. The next processing is consecutively proceeded to. However, if the processes are not all finished, the action returns to step 301. The processes from steps 301~314 are executed. Thus, the processes are executed in parallel by repeating the synchronization based on the synchronous status information "1" and the synchronization based on the synchronous status information "0".

On the other hand, the programs B are allocated to the processors 1-0, 1-1, 1-2, 1-3 absolutely independently of the action of the program A described above. A bit pattern "1111" is set in the synchronous mask registers 11b of the processors 1-0, 1-1, 1-2, 1-3. Parallel processing of the program B is also executed the same way as with the program A while taking the synchronization based on the synchronous status information "1" and the synchronization based on the synchronous status information "0".

As discussed above, in the synchronous processing apparatus for performing the processor-to-processor synchronization, the synchronous processing element includes the plurality of the synchronous status registers, the synchronous mask registers, the synchronous indicating registers, etc. The plurality of user's parallel processing programs can be highly efficiently executed by a small number of processors.

Next, a fourth embodiment of the present invention will be discussed. FIG. 17 is a block diagram illustrating a construction of the synchronous processing element 10d in the fourth embodiment. The fourth embodiment has a construction in which a plurality of processes are executable. In the case of executing, for instance, only one process, however, this involves the use of one group of registers. The other group of registers are useless. Under such circumstances, the parallel processing programs are executed by switching over the plurality of processes and one process in accordance with the fourth embodiment.

Referring to FIG. 17, a synchronous processing element 10d in the fourth embodiment includes a synchronous status register 12a, a synchronous mask register 11a, a synchronous receiving element 15a, a synchronous detecting element 13a and a synchronous indicating register 14a. The synchronous processing element 10d further includes a synchronous status register 12b, a synchronous mask register 11b, a synchronous receiving element 15b, a synchronous detecting element 13b and a synchronous indicating register 14b.

A synchronous side control register 18 accessed by the instruction processing element 8 is a 2-bit length register. The synchronous side control register 18 stores 2- or 1-process information for designating any one of two processes (two programs) or one process (one program) for one processor.

The synchronous side control register 18 imparts the 2- or 1-process information to the synchronous status registers 12a, 12b, the synchronous mask registers 11a, 11b, the synchronous receiving elements 15a, 15b, the synchronous detecting elements 13a, 13b and the synchronous indicating registers 14a, 14b.

FIG. 18(a–b) shows an action flow of two processes by one processor. As illustrated in FIG. 17, when executing the programs A and B in parallel, the instruction processing element 8 sets 2-process information "01" in the synchronous side control register 18. The synchronous status register 12a, the synchronous mask register 11a, the synchronous receiving element 15a, the synchronous detecting element 13a and the synchronous indicating register 14a execute the processes of the program A. These processes are executed while taking the synchronization on the basis of the 2-process information "01".

Figure 18B:
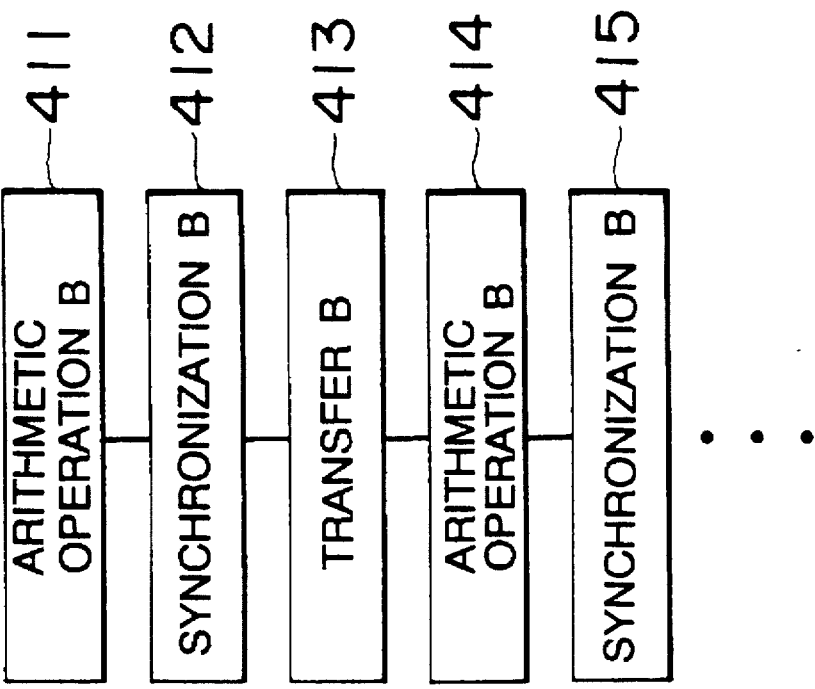
FIG. 18(b) is a flowchart showing the processing of program B within one processor.
Figure 18A:
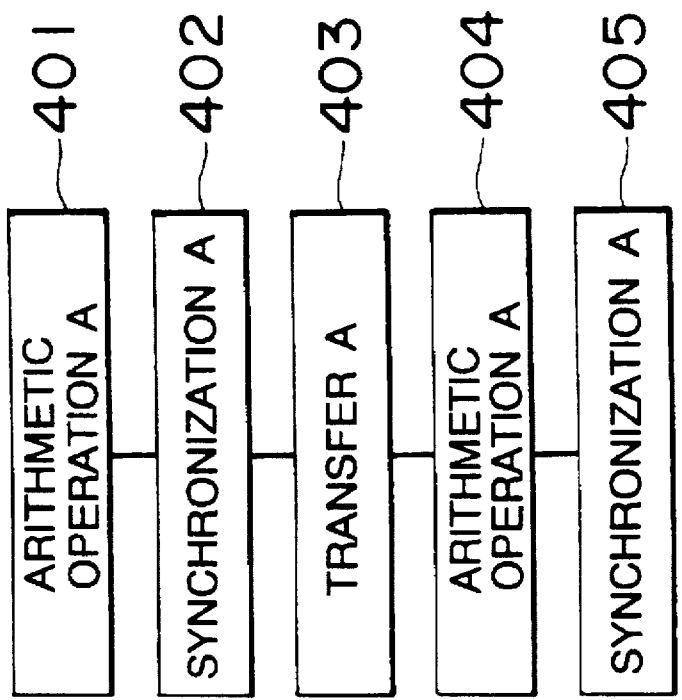
FIG. 18(a) is a flowchart showing the processing of program A within one processor.

As shown in FIG. 18(a), the instruction processing element 8 performs an arithmetic operation A of the program A within one processor (step 401). Then, the synchronous processing element 10d executes synchronization A (step 402). The data transfer element 9 effects a transfer A of data of an arithmetic result to other processors (step 403). Further, the action proceeds to the next process, and steps 404, 405 are to be conducted.

Further, "10" is set in the synchronous side control register 18. The synchronous status register 12b, the synchronous mask register 11b, the synchronous receiving element 15b, the synchronous detecting element 13b and the synchronous indicating register 14b execute the processes of the program B. These processes are executed while taking the synchronization on the basis of the 2-process information "10".

As shown in FIG. 18(b), the instruction processing element 8 performs an arithmetic operation B of the program B within one processor (step 411). Then, the synchronous processing element 10d executes synchronization B (step 412). The data transfer element 9 effects a transfer B of data of an arithmetic result to other processors (step 413). Further, the action proceeds to the next process, and steps 414, 415 are to be conducted. Namely, the 2-process actions are effected by one processor.

FIG. 19(a–b) shows an action flow of one process by one processor. Given next is an explanation of a case where one program C is divided into subprograms C1, C2 which are to be executed in parallel. One-process information "11" is set in the synchronous side control register 18. Hereat, the synchronous status register 12a, the synchronous mask register 11a, the synchronous receiving element 15a, the synchronous detecting element 13a and the synchronous indicating register 14a execute the process of the subprogram C1. This process is executed while taking the synchronization on the basis of the 1-process information "11".

As shown in FIG. 19(a), the instruction processing element performs an arithmetic operation C1 of the subprogram C1 within one processor (step 421). Then, the synchronous processing element executes synchronization C1 (step 422). The data transfer element effects a transfer C1 of data of an arithmetic result to other processors (step 423). Further, the action proceeds to the next process, and steps 424, 425 are to be conducted.

Further, the synchronous status register 12b, the synchronous mask register 11b, the synchronous receiving element 15b, the synchronous detecting element 13b and the synchronous indicating register 14b execute while taking the synchronization on the basis of the 1-process information "11".

As shown in FIG. 19(b), the instruction processing element performs an arithmetic operation C2 of the subprogram C2 within one processor (step 431). Then, the synchronous processing element executes synchronization C2 (step 432). The data transfer element effects a transfer C2 of data of an arithmetic result to other processors (step 433). Further, the action proceeds to the next process, and steps 434, 435 are to be conducted. Namely, the 1-process actions are effected by one processor.

As discussed above, it is possible to efficiently execute the parallel processing programs of a plurality of users and the parallel processing program of one user by switching over the actions of the 2-process by one processor or the actions of 1-processor by one processor.

Next, a fifth embodiment of the present invention will be discussed. The synchronous processing apparatus shown in the preceding third embodiment comprises the processors each provided with couples of registers, etc. When executing the plurality of parallel processing programs, the broadcasting line through which the synchronous status information of each processor is broadcasted is set per process.

In the case of executing one process, however, only the 1-set broadcasting line is used. In this case, one process undergoes processing by use of a plurality of broadcasting lines, thereby speeding up the processing.

Figure 20:
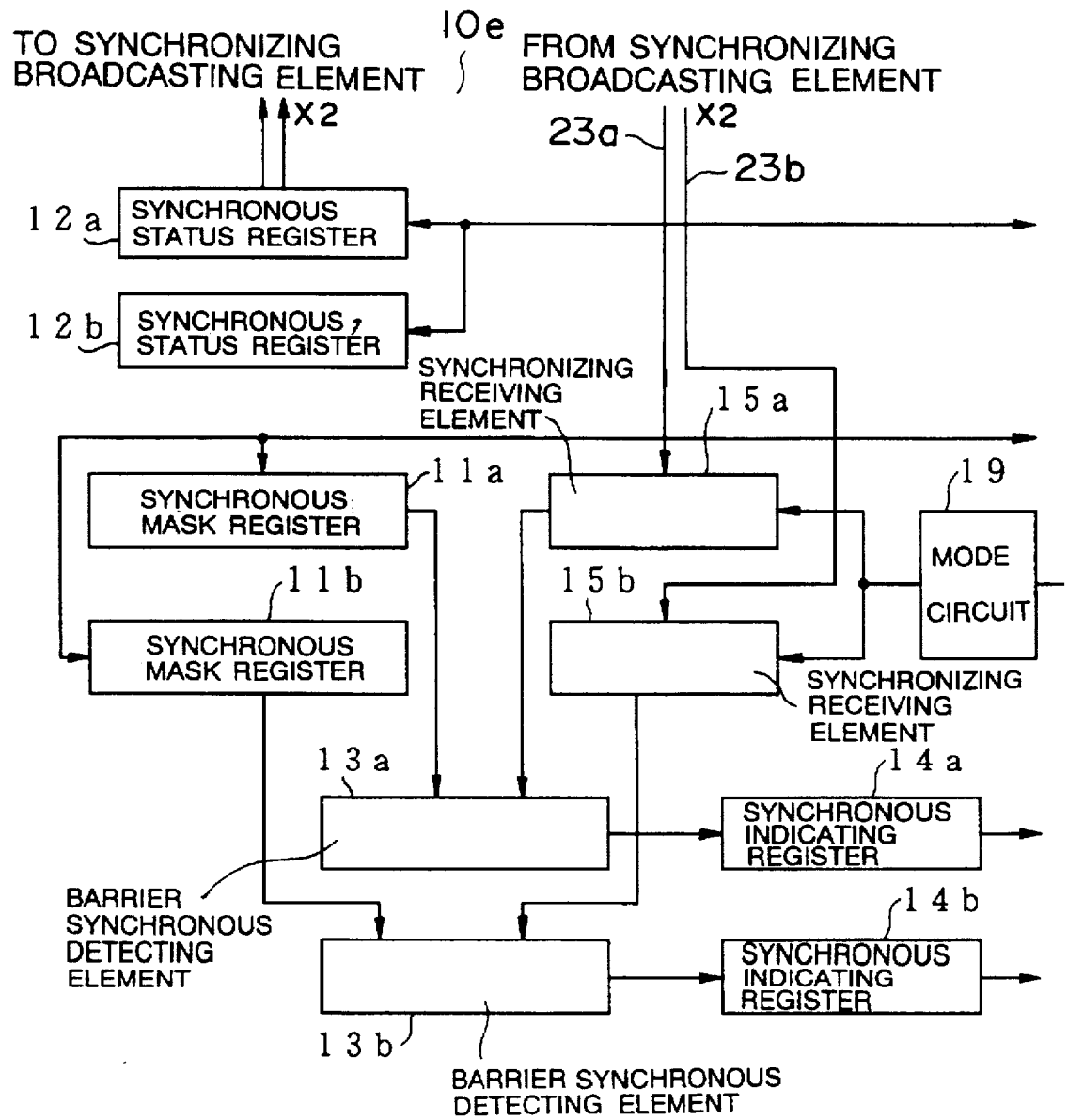
FIG. 20 is a block diagram illustrating a configuration of a synchronous processing element according to a fifth embodiment.

The fifth embodiment aims at processing one process while taking the synchronization by using the plurality of broadcasting lines. FIG. 20 is a block diagram illustrating a construction of a synchronous processing element 10e in the fifth embodiment. The synchronous processing element 10e in the fifth embodiment includes, as in the case of the synchronous processing element 10c in the third embodiment, the registers, etc. provided in two's. The synchronous processing element 10e also includes two broadcasting line 23a, 23b corresponding to the synchronous receiving elements 15a, 15b.

A mode circuit 19 is connected to the instruction processing element 8 and the synchronous receiving elements 15a, 15b. The mode circuit 19 is defined as a 1-bit length register in which 1-mode information "0" or 2-mode information "1" is set when switching on a power supply of a processor synchronous processing apparatus. The mode circuit 19 works to connect the synchronous broadcasting lines 23a, 23b to the synchronous receiving element 15a when the 1-mode information "0" is set. The mode circuit 19 further works to connect the synchronous broadcasting line 23a to the synchronous receiving element 15a in the case of the 2-mode information "1" as well as connecting the synchronous broadcasting line 23b to the synchronous receiving element 15b.

FIG. 21 is a diagram showing a data format of a 2-process mode on the synchronous broadcasting line in the fifth embodiment. FIG. 22 is a diagram showing a data format of a 1-process mode on the synchronous broadcasting line in the fifth embodiment.

Based on the construction given above, the 2 processes are processed in parallel by use of a couple of synchronous status registers 11a, 11b. This parallel processing will be explained with reference to FIGS. 20 and 21. At first, the instruction processing element 8 sets 2-mode information "1" in the mode circuit 19. Hereupon, the mode circuit 19 works to connect the synchronous broadcasting line 23a to the synchronous receiving element 15a and the synchronous broadcasting line 23b to the synchronous receiving element 15b.

Then, as depicted in FIG. 21, a header is broadcasted through the synchronous broadcasting line 23a. Further, a piece of synchronous status information a of the synchronous status register 12a is broadcasted therethrough. In this parallel action, the header is broadcasted via the synchronous broadcasting line 23b. Furthermore, a piece of synchronous status information b is broadcasted via the same line. Hereupon, the synchronous receiving element 15a receives the synchronous status information a of the synchronous status register 12a. The synchronous receiving element 15b receives the synchronous status information b of the synchronous status register 11b. The two processes are thereby executable in parallel.

Next, there will be explained a case where one process is processed by use of one synchronous status register 12a, etc. with reference to FIGS. 20 and 22. When the instruction processing element 8 sets 1-mode information "0" in the mode circuit 19, the mode circuit 19 works to connect the synchronous broadcasting lines 23a, 23b to the synchronous receiving element 15a.

Then, the synchronous status information of the synchronous status register 12a is broadcasted via the two synchronous broadcasting lines 23a, 23b. For example, as shown in FIG. 22, with respect to the synchronous status information, a piece of synchronous status information a1 is transmitted from the broadcasting line 23a, and, after a given time has elapsed, a piece of synchronous status information a2 is transmitted from the broadcasting line 23b. That is, the pieces of information are transmitted with a phase shift due to a serial bit. In the synchronous receiving element 15a of each processor, the synchronization can be taken based on the synchronous status information in which timings are matched in the two broadcasting lines 23a, 23b.

The apparatus capable of executing the 2 processes in this manner is provided with the mode circuit 19 which can set the two modes, i.e., the 1- and 2-process modes. When executing only the 1-process mode, the mode circuit 19 sets the 1-process mode. Namely, the synchronous status information is transferred by use of the two broadcasting lines 23a, 23b during the 1-process mode. The synchronization can be therefore taken at a high speed, and the parallel processing programs are executable at a high efficiency.

Next, the sixth embodiment of the present invention will be explained. The synchronous status information is serially transferred in bits through the synchronous broadcasting lines. A 1-bit parity error may, however, be caused due to an influence of noises, etc. with respect to the synchronous status information on the synchronous broadcasting lines. Conventionally, the processor in which the parity error is detected is disconnected from the network 2, and hence the execution of the program is interrupted. If the execution of the program is interrupted due to such a non-serious error, the execution of the processing becomes inefficient.

Figure 23:
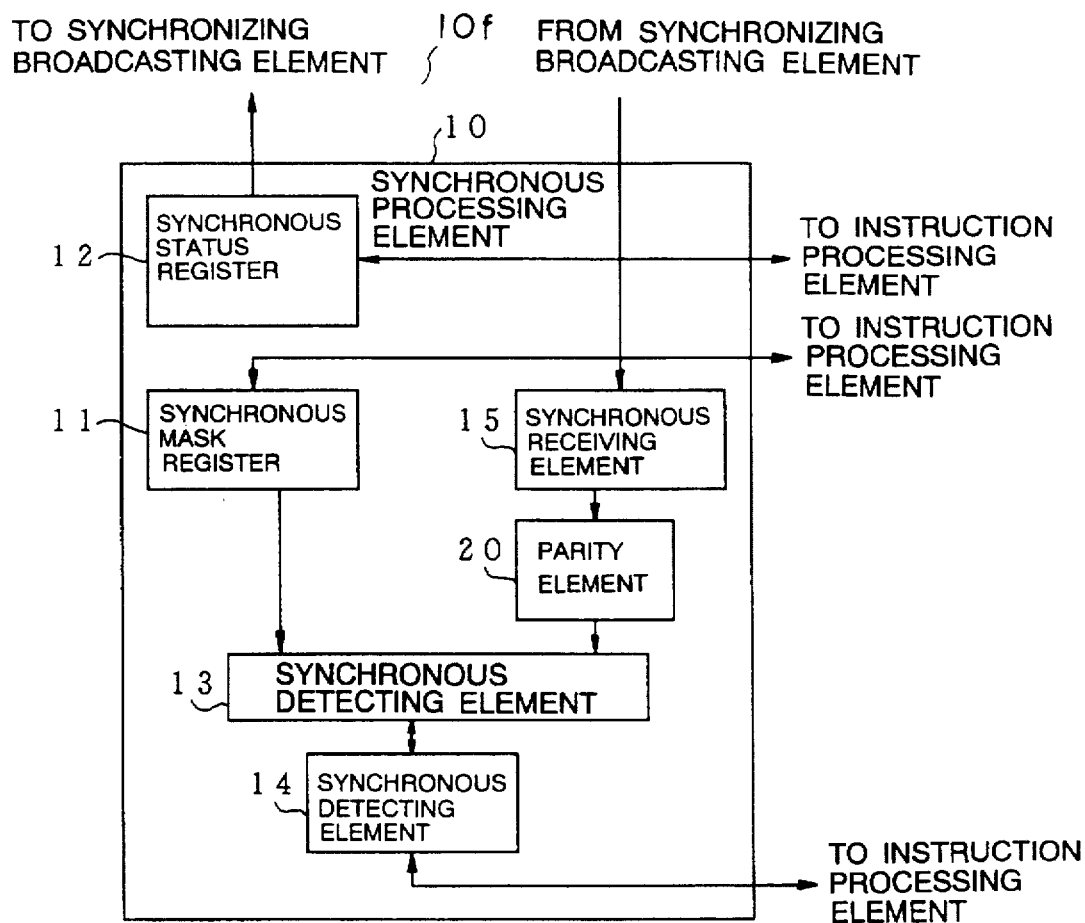
FIG. 23 is a block diagram illustrating a configuration of a synchronous processing element according to a sixth embodiment.
Figure 24:
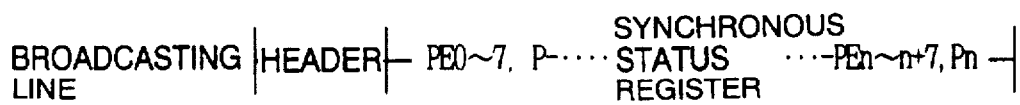
FIG. 24 is a diagram showing a data format on the synchronous broadcasting line.

In the sixth embodiment, if the 1-bit error is produced in the broadcasting line, the processing is executed without interrupting the program. FIG. 23 is a block diagram illustrating a construction of a synchronous processing element 10f. FIG. 24 shows a data format on the synchronous broadcasting line. As shown in FIG. 24, the data such as a header, synchronous status information of the processors 1-0-1-7 and a parity P are transmitted in serial via the synchronous broadcasting line.

The synchronous receiving element 15 is a register for receiving the synchronous status information which has been broadcasted in 1-bit serial from the synchronous broadcasting element 22. At the same time, the synchronous receiving element 15 receives the 1-bit parity per 8 bits and hold these items of information. A parity error detecting element 20 checks whether or not an error exists in the 1-bit parity received per 8 bits by the synchronous receiving element 15.

Figure 25:
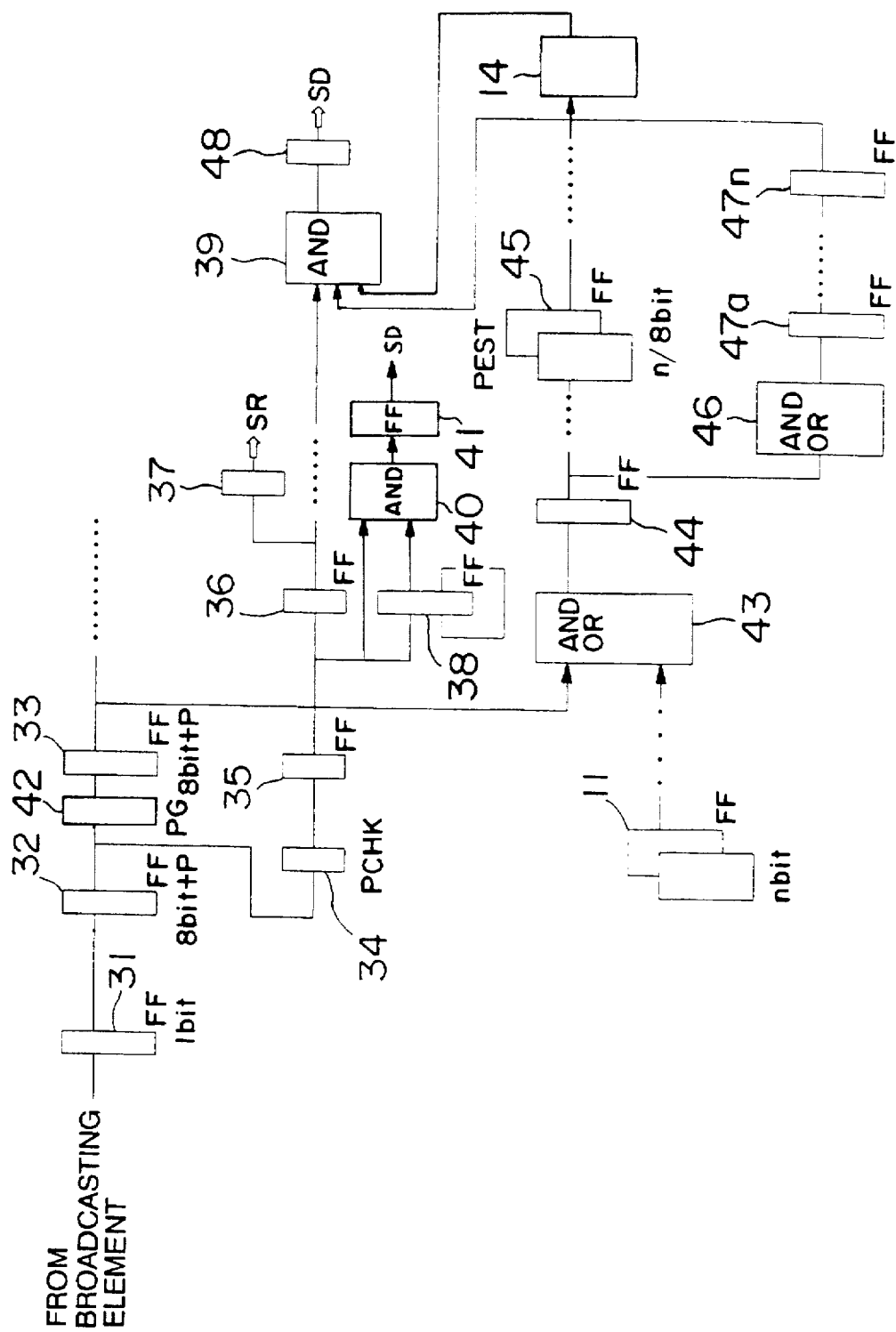
FIG. 25 is a block diagram illustrating a configurations of a parity error detecting element and its peripheral portions.

FIG. 25 is a block diagram illustrating configurations of the parity error detecting element 20 and its peripheral portion. The operation of the embodiment 6 will be explained referring to FIGS. 23 and 25. A 1-bit length flip-flop (FF) 31 receives the synchronous status information broadcasted in 1-bit serial via the synchronizing broadcasting line 23 from the synchronous broadcasting element 22. The synchronous status information is 1-bit information of "0" or "1". This synchronous status information is broadcasted via the synchronous broadcasting line to each processor. When this synchronous status information passes through the synchronous broadcasting line, it may happen that, for example, "1" is changed bitwise into "0" due to the outside noises.

Parity error detecting element 20 checks whether or not an error is caused in the 8-bit synchronous status information received by synchronous receiving element 15 by use of the 1-bit parity bit P. FF32 adds a 1 parity bit to 8 bits of the synchronous status information. Parity checker 34 (PCHK) checks whether or not an error is produced in a tuple of 8 bits of synchronous status information and 1 parity bit, which is given by FF32. For instance, if a total sum of 8 bits of synchronous status information and 1 parity bit is set to odd-numbered bits, parity checker 34 judges an error to exist if the given-by-FF32 total sum of 8 bits of synchronous status information and 1 parity bit is not the odd-numbered bits.

The following is an explanation of how the parity error is detected when the data from the synchronous broadcasting line is such data that the content of synchronous indicating register 14 is not changed. To start with, the data sent from the synchronous broadcasting line is, for instance, "110000001". High-order 8 bits are the synchronous status information, while low-order 1 bit is the parity bit. In this case, the total sum of bits is 3 bits, i.e., an odd number. It is also assumed that the data from FF32 is "110000011". In this case, the total sum of bits is 4 bits, i.e., an even number. Parity checker 34 therefore judges that there is an error.

In this instance, the error information from parity checker 34 is transferred via FF35, FF36 to FF37. FF37 informs instruction processing element 8 of system retaining ("SR") information indicating that the system is not interrupted. At this time, FF38 retains parity error information. In addition, if parity checker 34 again detects the error, AND40 ANDs error information of parity checker 34 through FF35 and error information already stored in FF38. FF41 notifies instruction processing element 8 of system-down information with an AND output of AND40. In this case, the processor which detects the error is disconnected from network 2.

Further, a parity generator 42 modifies the parity bit "1" of the data "110000011" from FF32 to "0", thereby generating data "110000010". This data "110000010" is inputted via FF33 to AND43. AND43 ANDs the data "110000001" stored in synchronous mask register 11 and the above data "110000010" and outputs the result to synchronous indicating register 14 via FF44, FF45.

In this instance, the data "110000001" from synchronous mask register 11 is different from the above data "110000010" from FF33. Therefore, if the parity error is produced, a value of synchronous indicating register 14 remains "0", because it does not change.

The following is an explanation of how the parity error is detected when the data from the synchronous broadcasting line is such data as to change the content of synchronous indicating register 14. First, it is assumed that the data sent from the synchronous broadcasting line is, e.g. "100000000". In this case, a total sum of bits is 1 bit. The data from FF32 is, it is also assumed, "110000000". Further, parity generator 42 modifies the parity bit "0" of the data "110000000" from FF32 to "1", thereby generating data "110000001". This data "110000001" is inputted via FF33 to AND43. AND43 ANDs the data "110000001" stored in synchronous mask register 11 and the above data "110000001" and outputs the result to synchronous indicating register 14 via FF44, FF45.

In this case, the data "110000001" from FF33 is identical with the data "110000001" from synchronous mask register 11, and hence the value of synchronous indicating register 14 changes from "0" to "1". Note that the value of synchronous indicating register 14 reversely changes from "1" to "0" as the case may be. Further, AND 39 ANDs the data from FF36, the data from synchronous indicating register 14 and the data from FFs 47a18 47n through AND46. If the parity error is present, AND39 is turned ON and modifies instruction processing element 8 of the system-down information.

Therefore, when the 1-bit parity error is caused in the data on the broadcasting line due to the influence of the noises, etc., the processing can be executed without interrupting the program, so that parallel processing of a program can be executed with high efficiency.

It is apparent that, in this invention, a wide range of different working modes can be formed based on the invention without deviating from the spirit and scope of the invention. This invention is not restricted by its specific working modes disclosed above.

What is claimed:

1. A synchronous processing method for a plurality of processors each executing programs and transferring information between the plurality of processors, said method comprising the steps of:

each of said plurality of processors storing synchronization combination information, indicating a combination of a group of said plurality of processors to execute processes in a program in parallel and in synchronism, to a first register having a same number of bits as a number of said plurality of processors in said group and to a second register having a minimum number of bits necessary to distinguish each of said groups of processors from each other, such that a total number of bits of said first and second registers is less than a total number of said plurality of processors;

each of said plurality of processors storing synchronous status information indicating that a synchronization waiting status is reached when said respective processors complete one said process in said program corresponding to said group;

each of said plurality of processors transmitting said stored synchronous status information to said group of said plurality of processors through a communication device;

each of said plurality of processors in said group receiving said transmitted synchronous status information through said communication device;

each of said plurality of processors judging whether said processors in said group are in synchronism based on said received synchronous status information and said stored synchronization combination information; and upon judging that said processors in said group are in synchronism, each of said plurality of processors in said group shifting to execute a successive process in said corresponding program, said group of processors thereby executing said processes in said program in parallel and in synchronism.

2. The method according to claim 1, wherein said synchronous status information storing step includes the step of alternately storing synchronous status information "1" and synchronous status information "0" for each completed process in said program.

3. The method according to claim 1, wherein said judging step includes the step of storing said received synchronous status information in a register.

4. The method according to claim 1, wherein said judging step includes the step of performing logic operations between said received synchronous status information and said stored synchronization combination information.

5. The method according to claim 1, wherein said shifting step includes the step of storing synchronous indicating information for indicating that said group of processors are in synchronism.

6. The method according to claim 1, wherein said judging step includes the step of detecting a parity error of said synchronous status information on a broadcasting line through which the synchronous status information is transmitted to said plurality of processors.

7. A synchronous processing apparatus comprising:

a plurality of processing elements which execute processes for a plurality of programs, a group of said plurality of processing elements executing processes in one of said programs in parallel and in synchronism; and a communication device through which data is transferred between said plurality of processing elements, each of said processing elements including:

synchronization combination storage means for storing synchronization combination information, indicating a combination of a group of said plurality of processing elements to execute processes in one of said programs in parallel and in synchronism, to a first register having a same number of bits as a number of said plurality of processing elements in said group and to a second register having a minimum number of bits necessary to distinguish each of said groups of processing elements from each other, such that a total number of bits of said first and second registers is less than a total number of said plurality of processors;

synchronous status storing means for storing synchronous status information indicating that a synchronization waiting status is reached when said processing element completes one of said processes in said program corresponding to said group;

storage control means for controlling said synchronous status storing means to store said synchronous status information and for simultaneously transmitting said stored synchronous status information to said group of said plurality of processing elements;

synchronous receiving means for receiving said transmitted synchronous status information;

synchronous judging means for judging whether said group of processing elements are in synchronism based on said received synchronous status information transmitted from said group of said processing elements and said stored synchronization combination information; and shifting means for shifting, when said synchronous judging means judges that said group of processing elements are in synchronism, said group of processing elements to execute a successive process in said corresponding program, said group of processing elements thereby executing processes in said program in parallel and in synchronism.

8. The apparatus according to claim 7, wherein said synchronous status storing means alternately stores synchronous status information "1" and synchronous status information "0" for each completed process in said program.

9. The apparatus according to claim 7, wherein said synchronous status storing means includes a 1-bit length register.

10. The apparatus according to claim 7, wherein said storage control means controls said synchronization combination storage element to store said synchronization combination information.

11. The apparatus according to claim 7, wherein said synchronous receiving means includes means for storing said received synchronous status information.

12. The apparatus according to claim 11, wherein said synchronous receiving means includes a register the bit number of which corresponds to the number of said plurality of processing elements, and said register stores, when receiving said synchronous status information, said synchronous status information in bit strings corresponding to said plurality of processing elements.

13. The apparatus according to claim 11, wherein said synchronous judging means includes a logic operation circuit for performing logic operations between said synchronous status information supplied from said synchronous receiving means and said synchronization combination information supplied from said synchronization combination storage means, thereby judging whether said group of processing elements are in synchronism.

14. The apparatus according to claim 7, wherein said synchronization combination storage means includes a register the bit number of which corresponds to the number of said plurality of processing elements, and said register stores synchronous status information "1" in a bit string corresponding to said processing elements in said group among said bit strings corresponding to said plurality of processing elements.

15. The apparatus according to claim 7, wherein said shifting means includes a synchronous indicating register which stores synchronous indicating information indicating that said group of processors are in synchronism.

16. The apparatus according to claim 7, wherein said first register has the bit number of which corresponds to half the number of said plurality of processing elements.

17. The apparatus according to claim 16, wherein said control register is a 1-bit register which stores control information "1" and "0" for designating one of two programs to be executed by a group of said plurality of processing elements.

18. The apparatus according to claim 11, wherein said synchronous receiving means includes a parity error detecting element for detecting a parity error of said synchronous status information on a broadcasting line through which said synchronous status information is transmitted to said plurality of processing elements.

19. The apparatus according to claim 18, wherein when said parity error detecting element detects a 1-bit error, said processing element continues processing without interrupting the processing of said programs.

20. A synchronous processing apparatus comprising:
a plurality of processing elements which execute processes for a plurality of programs, a group of said plurality of processing elements executing processes in one of said programs in parallel and in synchronism; and
a communication device through which data is transferred between said plurality of processing elements,
each of said plurality of processing elements including:
a plurality of synchronous status storage means, respectively corresponding to a plurality of programs to reduce a number of said plurality of processing elements by processing said plurality of programs in parallel, for storing synchronous status information indicating that a synchronization waiting status is reached when said processing element completes one of said processes in said program corresponding to said group;
storage control means for controlling said plurality of synchronous status storage means to store said synchronous status information and for simultaneously transmitting said stored synchronous status information to said group of said plurality of processing elements;
a plurality of synchronous judging means, respectively corresponding to said plurality of synchronous status storage means to reduce said number of said plurality of processing elements by processing said plurality of programs in parallel, for each judging whether said group of processing elements corresponding to one program are in synchronism; and
shifting means for shifting, when any one of said plurality of synchronous judging means judges that said processing elements are in synchronism, said group of processing elements to execute a successive process of said corresponding program, said group of processing elements thereby executing processes in said program in parallel and in synchronism.

21. The apparatus according to claim 20, further comprising a selecting means for selecting any one of synchronous processing of a plurality of programs and synchronous processing of one program, which is to be performed by said plurality of synchronous status storage means and by said plurality of synchronous judging means.

22. The apparatus according to claim 21, wherein said selecting means includes a register controlled by said storage control means.

23. The apparatus according to claim 20, wherein said plurality of synchronous judging means includes a plurality of synchronous receiving means for receiving said synchronous status information transmitted from all of said processing elements and for storing said received synchronous status information.

24. The apparatus according to claim 23, further comprising a plurality of synchronous broadcasting lines through which said synchronous status information is transmitted and corresponding to said plurality of synchronous receiving means, and a mode circuit for connecting each said broadcasting line to a corresponding said synchronous receiving means when processing a plurality of programs and for connecting each said broadcasting line to one of said synchronous receiving means when processing one program.

25. The apparatus according to claim 20, wherein each of said storage control means alternately stores synchronous status information "1" and synchronous status information "0" for each completed process in said program.

26. The apparatus according to claim 20, wherein said synchronous status storage means includes a 1-bit length register.

27. The apparatus according to claim 23, wherein said synchronous receiving means includes a register the bit number of which corresponds to the number of said plurality of processing elements, and said register stores, when receiving said synchronous status information, said synchronous status information in bit strings corresponding to said plurality of processing elements.

28. The apparatus according to claim 23, further comprising synchronous combination storage means for storing synchronization combination information indicating a combination of a group of said plurality of processing elements to execute processes in one of said programs in parallel and synchronism and wherein said synchronous judging means includes a logic operation circuit for performing a logic operation between said synchronous status information supplied from said synchronous receiving means and said synchronization combination information supplied from said synchronization combination storage means, thereby judging whether said group of processing elements are in synchronism.

29. The apparatus according to claim 20, wherein said shifting means includes a plurality of synchronous indicating registers for storing synchronous indicating information indicating that said group of processing elements are synchronized.

30. The method according to claim 1, wherein said second register is a n-bit length register which stores control information "1" and "0" for designating one of $2^n$ programs to be executed by $2^n$ groups.

31. The method according to claim 1, wherein said first register has the bit number of which corresponds to half the number of said plurality of processors.

32. The method according to claim 31, wherein said second register is a 1-bit length register which stores control information "1" and "0" for designating one of two programs to be executed by said group of said plurality of processors.

33. The apparatus according to claim 7, wherein said second register is a n-bit length register which stores control information "1" and "0" for designating one of $2^n$ programs to be executed by $2^n$ groups.

* * * * *

UNITED STATES PATENT AND TRADEMARK OFFICE
CERTIFICATE OF CORRECTION

PATENT NO. : 5,634,071
DATED : May 27, 1997
INVENTOR(S) : Masami DEWA, et al.

It is certified that error appears in the above-indentified patent and that said Letters Patent is hereby corrected as shown below:

TITLE PAGE - FOREIGN PATENT DOCUMENTS

Insert the following foreign patent documents:

--63-45670      02/88    Japan
  2-93756       04/90    Japan
  0475 282 A2   03/92    Europe
  0473 452 A2   03/92    Europe--

TITLE PAGE - OTHER PUBLICATIONS

Insert the following publication:

--IBM Technical Disclosure Bulletin, Vol. 31, No. 11, April 1989, pp. 382-389--

Column 9

Lines 11 and 12, "processors 1~01-(n-1)" should be --processors 1-0~1-(n-1)--.

Column 20

Line 64, "47$\alpha$18 47n" should be --47$\alpha$~47n--.

UNITED STATES PATENT AND TRADEMARK OFFICE
CERTIFICATE OF CORRECTION

PATENT NO. : 5,634,071
DATED : May 27, 1997
INVENTOR(S) : Masami DEWA, et al.

It is certified that error appears in the above-indentified patent and that said Letters Patent is hereby corrected as shown below:

<u>Column 20</u>

Line 64, "47α18 47n" should be --47α~47n--.

Signed and Sealed this

Fifth Day of August, 1997

Attest:

Attesting Officer

BRUCE LEHMAN

Commissioner of Patents and Trademarks